(12) United States Patent
Polacheck

(10) Patent No.: US 11,570,688 B2
(45) Date of Patent: Jan. 31, 2023

(54) SINGLE CHANNEL DEPLOYMENT OVER WIRELESS NETWORK TOPOLOGIES

(71) Applicants: Allied Telesis Holdings Kabushiki Kaisha, Tokyo (JP); Allied Telesis Holdings K.K., Tokyo (JP); Allied Telesis, Inc., Bothell, WA (US)

(72) Inventor: Shuval Polacheck, Shefayim (IL)

(73) Assignees: ALLIED TELESIS HOLDINGS KABUSHIKI KAISHA; ALLIED TELESIS HOLDINGS K.K.; ALLIED TELESIS, INC., Bothell, WA (US)

( * ) Notice: Subject to any disclaimer, the term of this patent is extended or adjusted under 35 U.S.C. 154(b) by 200 days.

(21) Appl. No.: 16/857,626

(22) Filed: Apr. 24, 2020

(65) Prior Publication Data

US 2020/0252855 A1   Aug. 6, 2020

Related U.S. Application Data

(63) Continuation-in-part of application No. 16/396,178, filed on Apr. 26, 2019, now Pat. No. 11,206,714.

(60) Provisional application No. 62/841,695, filed on May 1, 2019, provisional application No. 62/663,124, filed on Apr. 26, 2018.

(51) Int. Cl.
*H04W 40/22* (2009.01)
*H04W 56/00* (2009.01)
*H04W 84/12* (2009.01)
*H04W 88/08* (2009.01)

(52) U.S. Cl.
CPC ....... *H04W 40/22* (2013.01); *H04W 56/0015* (2013.01); *H04W 84/12* (2013.01); *H04W 88/08* (2013.01)

(58) Field of Classification Search
None
See application file for complete search history.

(56) References Cited

U.S. PATENT DOCUMENTS

| 6,240,426 B1 * | 5/2001 | Beyda | H04L 29/06 707/999.201 |
|---|---|---|---|
| 8,451,752 B2 * | 5/2013 | Lu | H04L 12/4641 370/254 |
| 8,699,406 B1 * | 4/2014 | Charles | H04J 3/0652 709/248 |
| 2002/0024935 A1 * | 2/2002 | Furukawa | H04B 7/155 370/349 |
| 2003/0112767 A1 * | 6/2003 | Meier | H04L 12/4625 370/256 |
| 2005/0180314 A1 | 8/2005 | Webster et al. | |

(Continued)

*Primary Examiner* — Sai Aung
*Assistant Examiner* — Liem H. Nguyen
(74) *Attorney, Agent, or Firm* — Concept IP LLP; Michael Zarrabian

(57) ABSTRACT

Systems, devices, and methods relate to a hybrid wireless access point (AP) which can support both single-channel mode and multi-channel mode at same time and within the same device. Uplink and/or downlink packets may be received by the hybrid AP, where the received packet may be same packet sent to different hybrid APs, and then each hybrid AP may decide to use these received packets for single-channel architecture (SCA), multi-channel architecture (MCA), or both. In SCA, the hybrid APs may communicate with each other to sync the SCA behavior.

18 Claims, 19 Drawing Sheets

(56) References Cited

U.S. PATENT DOCUMENTS

| | | | |
|---|---|---|---|
| 2006/0194616 A1* | 8/2006 | Willins | H04W 88/08 |
| | | | 455/562.1 |
| 2006/0198348 A1* | 9/2006 | Lin | H04W 88/02 |
| | | | 370/235 |
| 2007/0097906 A1* | 5/2007 | Kato | H04W 88/16 |
| | | | 370/328 |
| 2007/0236359 A1* | 10/2007 | Wynans | G01D 4/004 |
| | | | 340/664 |
| 2007/0297366 A1* | 12/2007 | Osann | H04W 40/06 |
| | | | 370/331 |
| 2008/0025275 A1* | 1/2008 | Cheng | H04W 48/20 |
| | | | 370/338 |
| 2012/0327898 A1* | 12/2012 | Lu | H04W 36/0058 |
| | | | 370/331 |
| 2014/0126466 A1 | 5/2014 | Hamdi et al. | |
| 2015/0208242 A1* | 7/2015 | Ji | H04W 12/122 |
| | | | 726/4 |
| 2015/0223168 A1 | 8/2015 | Bhanage et al. | |
| 2016/0057721 A1* | 2/2016 | Chandrashekar | H04W 84/00 |
| | | | 370/350 |
| 2017/0019165 A1* | 1/2017 | Ramasamy Chinannan | |
| | | | H04B 7/14 |
| 2017/0055236 A1* | 2/2017 | Levesque | H04J 3/0644 |
| 2018/0310226 A1* | 10/2018 | Kim | H04W 88/08 |
| 2019/0174577 A1* | 6/2019 | Patil | H04W 76/11 |
| 2019/0268892 A1* | 8/2019 | Gidvani | H04W 72/0406 |
| 2019/0392716 A1* | 12/2019 | Lu | H04W 4/44 |
| 2020/0120711 A1 | 4/2020 | Sevin et al. | |
| 2021/0258877 A1* | 8/2021 | Chitrakar | H04W 52/0216 |

\* cited by examiner

SINGLE CHANNEL DEPLOYMENT OVER WIRELESS NETWORK TOPOLOGIES

CROSS-REFERENCE TO RELATED APPLICATIONS

This application is a continuation-in-part of U.S. Nonprovisional patent application Ser. No. 16/396,178, filed Apr. 26, 2019, which claims priority to and the benefit of U.S. Provisional Patent Application No. 62/663,124, filed Apr. 26, 2018, and this application claims priority to and the benefit of U.S. Provisional Patent Application No. 62/841,695, filed May 1, 2019, the contents of which are hereby incorporated by reference herein for all purposes.

TECHNICAL FIELD

The present embodiments relate to wireless network deployments. In particular, the present embodiments relate to hybrid channel wireless devices and systems.

BACKGROUND

In computer networking, a wireless access point (WAP), or more generally just access point (AP), is a networking hardware device that allows a Wi-Fi® device to connect to a wired network. The AP usually connects to a router or controller (via a wired network) as a standalone device, but it can also be an integral component of the router or controller itself. The AP communicates with other client devices (clients) via wireless signals transmitted and received through a radio antenna system. AP may connect to a network over wired LAN connection or over wireless LAN connection. When connected over wireless LAN, the AP may connect over different wireless topologies that may include other AP devices. AP in wireless network topology that is also connected over wired LAN often defined as portal AP, while AP without wired LAN connection is often defined as satellite AP.

SUMMARY

A system embodiment may include: a switch; one or more portal access points (APs), where each portal AP may be connected to the switch by a wired connection; and one or more satellite APs, where each of the one or more satellite APs has one or more wireless paths to a portal AP of the one or more portal APs by a wireless connection; where one or more synchronization frames may be received at each AP, where the one or more portal APs receive the one or more synchronization frames via a wired LAN, and where the one or more satellite APs receive the one or more synchronization frames via a wireless LAN; where the one or more synchronization frames may be proxied between at least two of: the one or more portal APs and the one or more satellite APs; and where the proxied synchronization frames may be forwarded to: the one or more portal APs and the one or more satellite APs while avoiding resending and receiving a frame of the proxied synchronization frames more than once.

In additional system embodiments, data sent from the switch to a satellite AP of the one or more satellite APs may be proxied through a portal AP of the one or more portal APs. In additional system embodiments, the data sent from the switch to the satellite AP may be further proxied through no connecting satellite APs. In additional system embodiments, the data sent from the switch to the satellite AP may be further proxied through one or more connecting satellite APs. In additional system embodiments, data sent from a satellite AP of the one or more satellite APs to the switch may be proxied through a portal AP of the one or more portal APs.

In additional system embodiments, the data sent from the satellite AP to the switch may be further proxied through no connecting satellite APs. In additional system embodiments, the data sent from the satellite AP to the switch may be further proxied through one or more connecting satellite APs. In additional system embodiments, data sent from a first satellite AP of the one or more satellite APs to a second satellite AP of the one or more satellite APs may be proxied through a first portal AP of the one or more portal APs in a sending AP area to a second portal AP of the one or more portal APs in a receiving AP area. In additional system embodiments, each proxied synchronization frame may be duplicated and proxied multiple times throughout the single channel via at least one of: wired links and wireless links.

In additional system embodiments, each duplicated and proxied synchronization frame comprises a source address and a destination address. In additional system embodiments, each duplicated and proxied synchronization frame further comprises an original source address and an original destination address. In additional system embodiments, the original source address holds the source of an original frame of the proxied synchronization frames. In additional system embodiments, the original destination address holds a destination of the original frame of the proxied synchronization frames. In additional system embodiments, the source address identifies an originator of the synchronization frame, where the originator may be one of the portal APs.

In additional system embodiments, the source address identifies an originator of the synchronization frame, where the originator may be one of the satellite APs. In additional system embodiments, the destination address identifies a destination of the synchronization frame, where the destination address may be one of the one or more portal APs. In additional system embodiments, the destination address identifies a destination of the synchronization frame, where the destination address may be one of the one or more satellite APs.

In additional system embodiments, each duplicated and proxied synchronization frame comprises a unique identifier, where the one or more portal APs and the one or more satellite APs ignore duplicates of the unique identifier from a received synchronization frame. In additional system embodiments, each synchronization frame sent over wireless LAN may be encapsulated under a frame subtype. In additional system embodiments, the frame subtype may be a vendor specific action frame.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
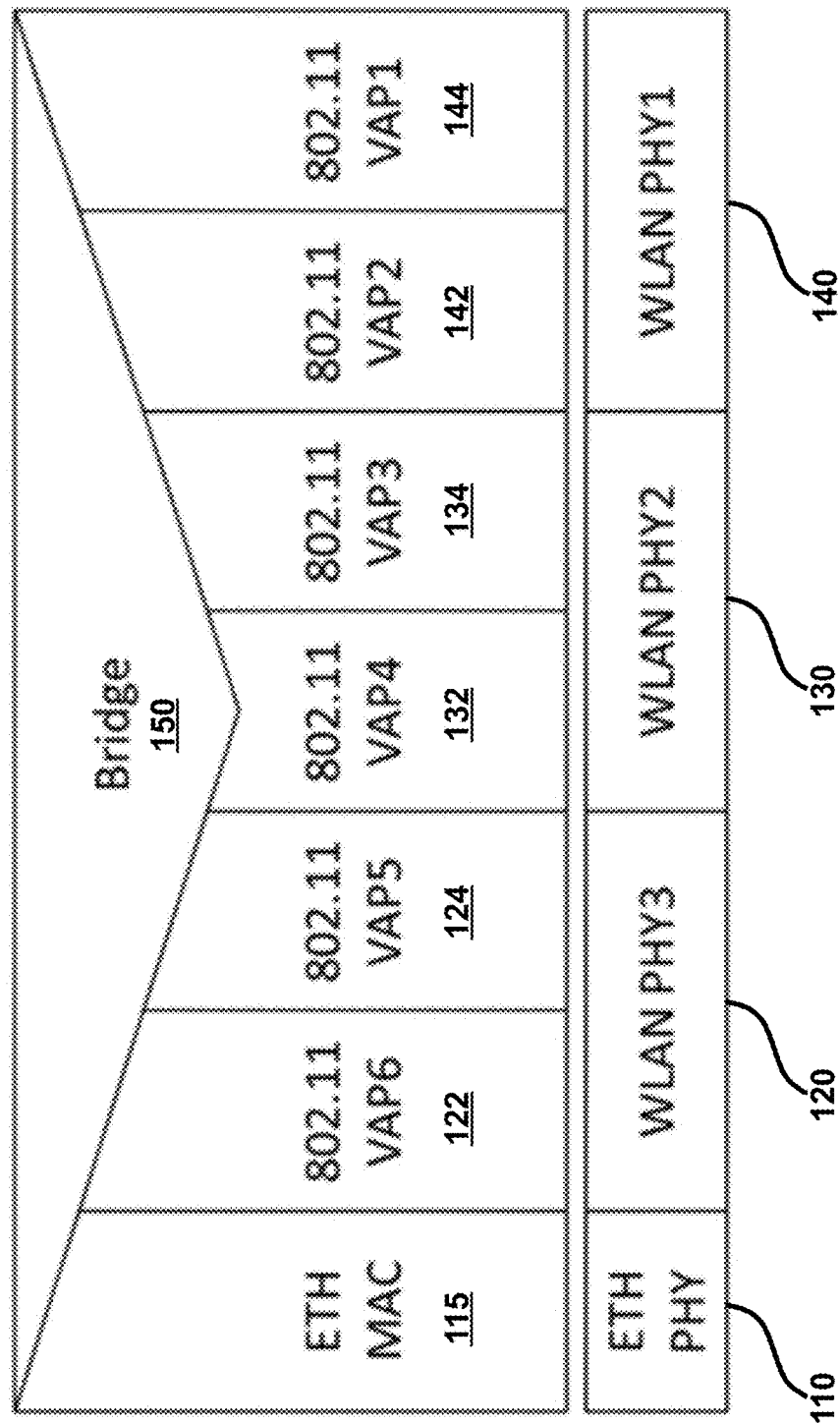
FIG. 1 depicts a conceptual illustration of an access point device layout.

The following detailed description describes the present embodiments with reference to the drawings. In the drawings, reference numbers label elements of the present embodiments. These reference numbers are reproduced below in connection with the discussion of the corresponding drawing features.

The disclosed system and method relate to a hybrid wireless access point (AP) which can support both single-channel mode and multi-channel mode at the same time and within the same device. Uplink and/or downlink packets may be received by the hybrid AP, where the received packet may be the same packet sent to different hybrid APs, and then each hybrid AP may determine whether to use these received packets for single-channel architecture (SCA), multi-channel architecture (MCA), or both. In SCA, the hybrid APs may communicate with each other to sync the SCA behavior. In standard MCA, APs do not talk with each other. If a device was connected to one hybrid AP over an SCA unique basic service set identifier (BSSID), this hybrid AP may announce this device to the other hybrid APs so that if or when the device roams to any other hybrid AP, each hybrid AP will know to consider its packets as part of SCA. All hybrid APs with a common SCA BSSID may share the same synced database of wireless stations. The packet redirecting decision may check the SCA database for the MAC address and if they are not there then the packet may be for MCA. Each hybrid AP may have a fixed number of physical devices, such as wireless radios, and many virtual devices refer to as Virtual Access Points (VAPs). Each VAP may be bounded to a radio and have a unique MAC address. In SCA, this address is mutual to VAPs on all APs while in MCA it must be different. By utilizing both SCA and MCA on a single hybrid AP, both SCA and MCA may be utilized without the need for dual and non-connected devices. For example, if ten APs were needed to cover an area, existing systems would require ten SCA APs and ten MCA APs for a total of twenty APs. By contrast, the system disclosed herein would only require ten hybrid APs with the ten hybrid APs in communication with one another.

There are different technologies that can solve a variety of scenarios in enterprise wireless deployment situations. Typically, a customer has had to choose the solution that better fits their needs or instead install several deployments for different scenarios. For example, 802.11k/r/v is considered a standard to provide seamless roaming in multi-channel architecture. However, new standards can require that the protocol is supported by both the wireless access points and wireless stations. Some client devices, such as smartphones and/or laptops support this protocol currently, but many Internet of Things (IoT) devices do not support this protocol. Therefore, a customer deploying wireless systems would have to make a substantial effort to adjust all the connected stations rather than supporting both architectures in order to give a seamless roaming solution for all types of stations. One option is to have a single multiple-channel architecture (MCA) deployment with 802.11k/r/v to service supported devices and to add an additional single-channel architecture (SCA) deployment for legacy devices. In this way, customers can enjoy the benefits of standard deployment but still support legacy devices over large areas.

Current wireless equipment works either in single-channel or multi-channel architectures and customers have to make a decision on which technology to base their deployment. As each architecture type has its own benefits and downsides the customer will take a higher risk when using only a single architecture. However, when deploying both architectures, the customer can adjust each architecture to their specific usage. Deploying the two architectures would require having separate hardware for each setup which increases the price and complexity. In many embodiments of the invention, both MCA and SCA setups can coexist on the same hardware and allow almost any combination of configurations between the two architectures.

As the number of Internet of Things (IoT) devices increase in wireless networks, there is an ever-increasing requirement for supporting these IoT devices. Some traditional Wi-Fi® stations such as, but not limited to, laptop and desktop computers require high throughput and roaming is not the biggest concern, making these client devices more suitable for MCA architectures. Other devices such as robots, sensors, and Voice over Internet Protocol (VoIP) devices typically require seamless mobility but do not often require much data throughput, making them more suitable for SCA architectures. As the benefits of single-channel and multi-channel are different, the disclosed system and method utilizes the benefits of a hybrid network by constructing a deployed wireless network using both technologies in accordance with many embodiments of the invention.

Embodiments in accordance with the invention describe an IEEE 802.11 deployment of multiple access points where each access point supports simultaneously some virtual access points (VAPs) that are part of single-channel architecture (SCA) as well as some VAPs that are part of multi-channel architecture (MCA). Current solutions require different systems and hardware for SCA and MCA, whereas embodiments of the proposed invention can run both MCA and SCA architectures simultaneously on the same devices.

In certain solutions, the customers deploying wireless networks would have to adjust their setup to the network rather than adjusting the network to the setup. Alternatively, these customers could double the equipment to support both architectures. In previous systems, the wireless AP is configurable for single channel use or for multi-channel use. Existing single access points cannot be used for both architectures at the same time. It is currently only possible to construct a hybrid MCA/SCA network only if both systems are deployed one-by-one in the same place using double the amount of APs. As such, when adjusting the setup to these networks, any change in station type or environment may require reconfiguring, reinstalling or replacing the network. This limits the client setup to supporting the current mode and does not leave room for future changes. Additionally, doubling the equipment is very expensive in costs, maintenance, energy use, and the like compared the method and system embodiments disclosed herein.

Implementing SCA architectures can be very complicated and falls out of the standards. So far, this has required some hardware and software adjustments that limit the available solutions to SCA only or MCA only. Constructing two kinds of wireless networks at the same time is not commonly required yet; most of the currently deployed wireless networks are constructed as multi-channel only. These multi-channel wireless networks have a roaming issue, which is known as a general problem of the Wi-Fi® system and for the SCA as well. However, there are various Wi-Fi® client devices such as sensors, robots, smartphones and laptops; their requirement for wireless networks is not always the same, so utilizing the benefits from both wireless network architectures can enhance the overall wireless network usefulness. Even if new protocols can solve the roaming issue in multi-channel networks in the future, many legacy Wi-Fi® systems will continue to be used and connectivity issues for those systems will remain.

In many embodiments of the disclosed system and method, single-channel and multi-channel hybrid wireless networks are constructed with reduced costs and hardware needs. In further embodiments, the hybrid access point devices and systems can separate the wireless network based on the purpose and benefit from both architectures. For example, performance demanding client devices such as laptops and personal computers (PCs) can use multi-channel architecture deployments which can easily have more channel and APs added if desired by the customer. IoT devices such as VoIP phones and systems for automation can utilize the benefits of single-channel architecture. In a number of embodiments of the present invention, an SCA BSSID can be considered as one cell and is also able to run 802.11k/r/v algorithms between the different SCA cells of the wireless deployment.

One advantage presented by the embodiments of the present invention is the cost savings to construct the hybrid wireless network. These saved costs can be utilized for the initial deployment and network management. In a number of embodiments, these initial cost savings may be achieved by reducing the number of APs which are required to deploy compared to the costs of constructing both MCA and SCA network systems separately. By way of example and not limitation, if a wireless deployment customer needs ten APs to cover all of an office area, it may be desired to construct a hybrid wireless network. This can be due to other solutions requiring twenty APs for each purpose (indicating a reduction of 50% of AP costs for a hybrid setup compared to a traditional SCA or MCA setup). Previous solutions would also require twenty sets of wires and construction costs for that wiring and installation. These increased wires and APs on the previous solutions lead to a requirement for more expensive switches that are configured to handle the increased number of AP wires, or to include a larger number of switches, and thus increased licenses for those switches.

With reference to FIG. 1, a conceptual illustration of an access point (AP) 100 device layout is shown. The AP 100 can include a physical Ethernet port 110 that connects the AP 100 to other devices such as a wireless controller (not shown). The physical Ethernet port 110 is associated with an Ethernet-based media access control (MAC) address 115. In one embodiment, each AP 100 may have a number of physical radios installed. By way of example, the embodiment illustrated in FIG. 1 has three physical radios for use in wireless local area networks (WLANs) and these radios are marked as WLAN PHY1 140, WLAN PHY2, 130 and WLAN PHY3, 120. Each physical radio 120, 130, 140 may transmit and receive wireless signals between the AP 100 and one or more user devices to communicate over a network. In a number of embodiments, the radios may utilize the Physical Layer of the 802.11 standard and can be configured to work on different channels in the 2.4 GHz and 5 GHz bands. Physical WLAN radios can be configured to have multiple virtual access points (VAPs) per physical radio. Each VAP acts as a secondary or additional hotspot but can share a single radio between multiple VAPs. Each VAP must be configured with a unique basic service set identifier (BSSID) and may share the same service set identifier (SSID) to allow for multiple connection types and/or connection configuration rules. The embodiment illustrated in FIG. 1 is configured such that each of a plurality of VAP 122, 124, 132, 134, 142, 144 utilizes the MAC layer of the 802.11 standard such that a multiple-channel architecture (MCA) is used. A bridge 150 is utilized to forward frames between all VAPs 122, 124, 132, 134, 142, 144 as well as access point 100 Ethernet connection 110 via the Ethernet MAC 115. These connections may allow for the connection and communication between client devices connected to the AP 100 and other external devices and networks including the Internet. In further additional embodiments, the bridge 150 can pass frames between interfaces according to the destination MAC address of the frames. The bridge 150 may contain a MAC table that can be dynamically filled according to a frame's source MAC address and the interface it came from.

In such an MCA setup, an embodiment could be utilized that allows for multiple APs 100 to be placed in various areas in order to create an area of wireless signal coverage. Because each VAP 122, 124, 132, 134, 142, 144 has a unique BSSID but may have the same SSID between all APs, when a user with a client device that is connected to a first VAP 144 on one AP walks out of range of the first VAP 144, but within range of a second VAP 134 on another AP, the client device must execute a process of disconnecting from the first VAP 144 and connecting to the second VAP 134 on a new access point to continue a connection to any other external networks connected to the access points 100 through the external Ethernet connection 110. A client device must initiate this disconnection/reconnection process each time the client device travels between VAP coverage areas. To avoid disconnecting, client devices will usually remain connected even when the signal is weak, which can cause a major impact to throughput.

Figure 2:
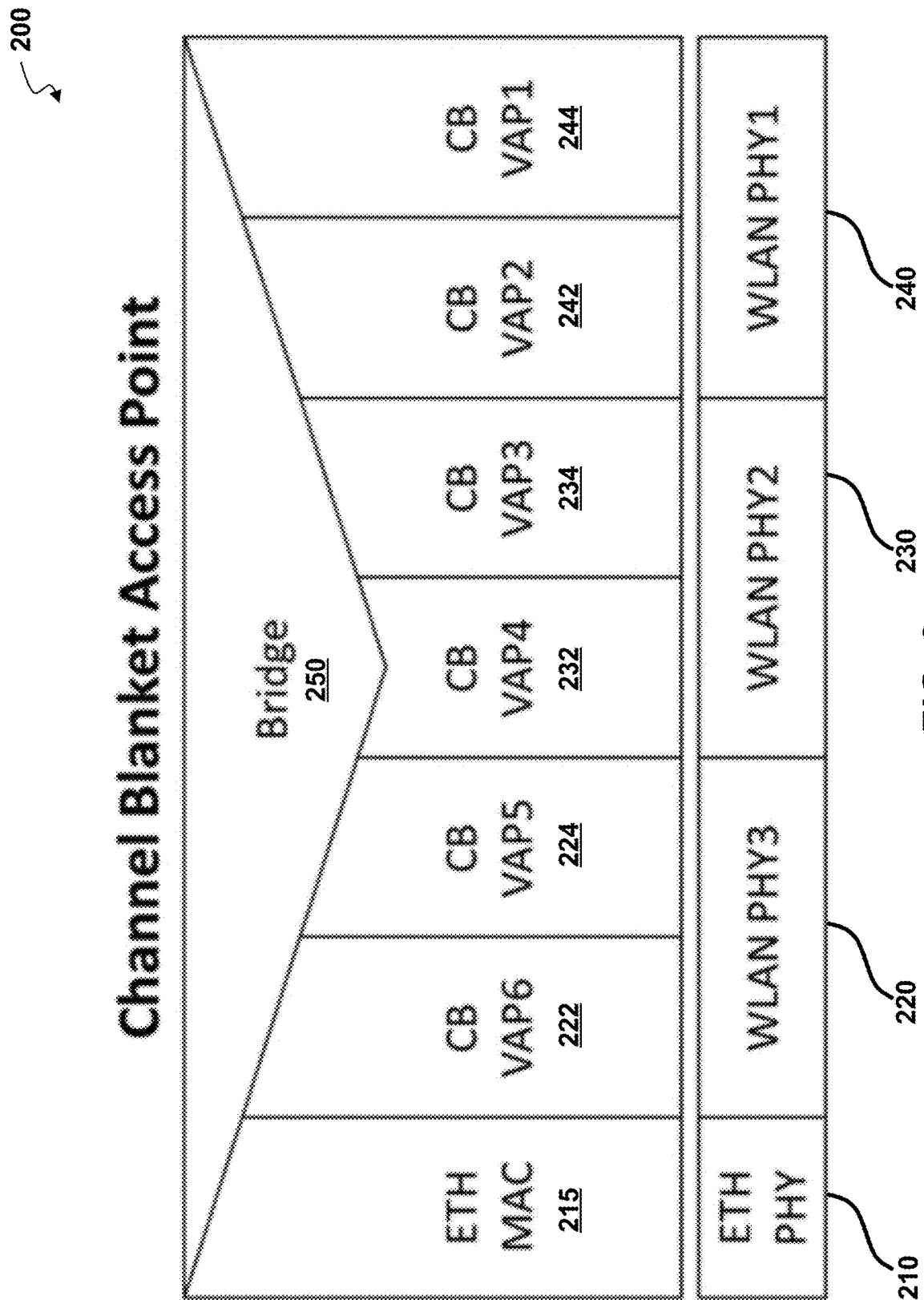
FIG. 2 is a conceptual illustration of a channel blanket access point device layout.

Similar to the access point 100 illustrated in FIG. 1, a conceptual illustration of a channel blanket access point 200 device layout is shown in FIG. 2. The channel blanket access point 200 can include a physical Ethernet port 210 that connects the channel blanket access point 200 to other devices such as a wireless controller (not shown). In one embodiment, the physical Ethernet port 210 may be associated with an Ethernet-based media access control (MAC) address 215. Each channel blanket access point 200 can have a number of physical radios installed. By way of example, the embodiment illustrated in FIG. 2 has three physical radios for use in wireless local area networks (WLANs) and are marked as WLAN PHY1 240, WLAN PHY2, 230 and WLAN PHY3, 220. Each physical radio 220, 230, 240 may transmit and receive wireless signals between the channel blanket access point 200 and one or more user devices to communicate over a network. In one embodiment, the radios 220, 230, 240 may be identical to the physical radios 120, 130, 140 as shown in FIG. 1, which may utilize the Physical Layer of the 802.11 standard and can be configured to work on different channels in the 2.4 GHz and 5 GHz bands. The channel blanket access point 200 may connect other devices over a wireless network topology such as mesh, wireless distribution system (WDS), etc. Such wireless paths may utilize one or more of the wireless radios 220, 230, 240. Physical WLAN radios can be configured to have multiple virtual access points (VAPs) per physical radio. Each VAP acts as a secondary or additional hotspot but can share a single radio between multiple VAPs. In SCA, two VAPs on different channel blanket access point s 200 can share the same basic service set identifier (BSSID) and the same service set identifier (SSID) to allow for a large area to be covered with same signal type. The embodiment illustrated in FIG. 2 is configured such that each of a plurality of VAPs 222, 224, 232, 234, 242, 244 utilizes a channel blanket such that a single-channel architecture (SCA) is used. A bridge 250 is utilized to connect all VAPs 222, 224, 232, 234, 242, 244 to the channel blanket access point 200 Ethernet connection 210 via the Ethernet MAC 215. This connection can allow for the connection and communication between client devices connected to the channel blanket access point 200 and other external devices and networks including the Internet.

In an SCA setup, an embodiment may be utilized that allows for multiple channel blanket access points 200 to be placed in various areas in order to create an area of wireless signal coverage. Because each VAP 222, 224, 232, 234, 242, 244 is identical between channel blanket access points, when a user with a client device that is connected to a first VAP 244 on one channel blanket access point walks out of range of that channel blanket access point, but within range of a second VAP, the client device does not have to execute a process of disconnecting from the first VAP 244 and connecting to the second VAP since the client device sees both VAP signals to be from the same BSSID source. A client device does not have to take any measures when traveling between multiple SCA VAP coverage areas.

Figure 3:
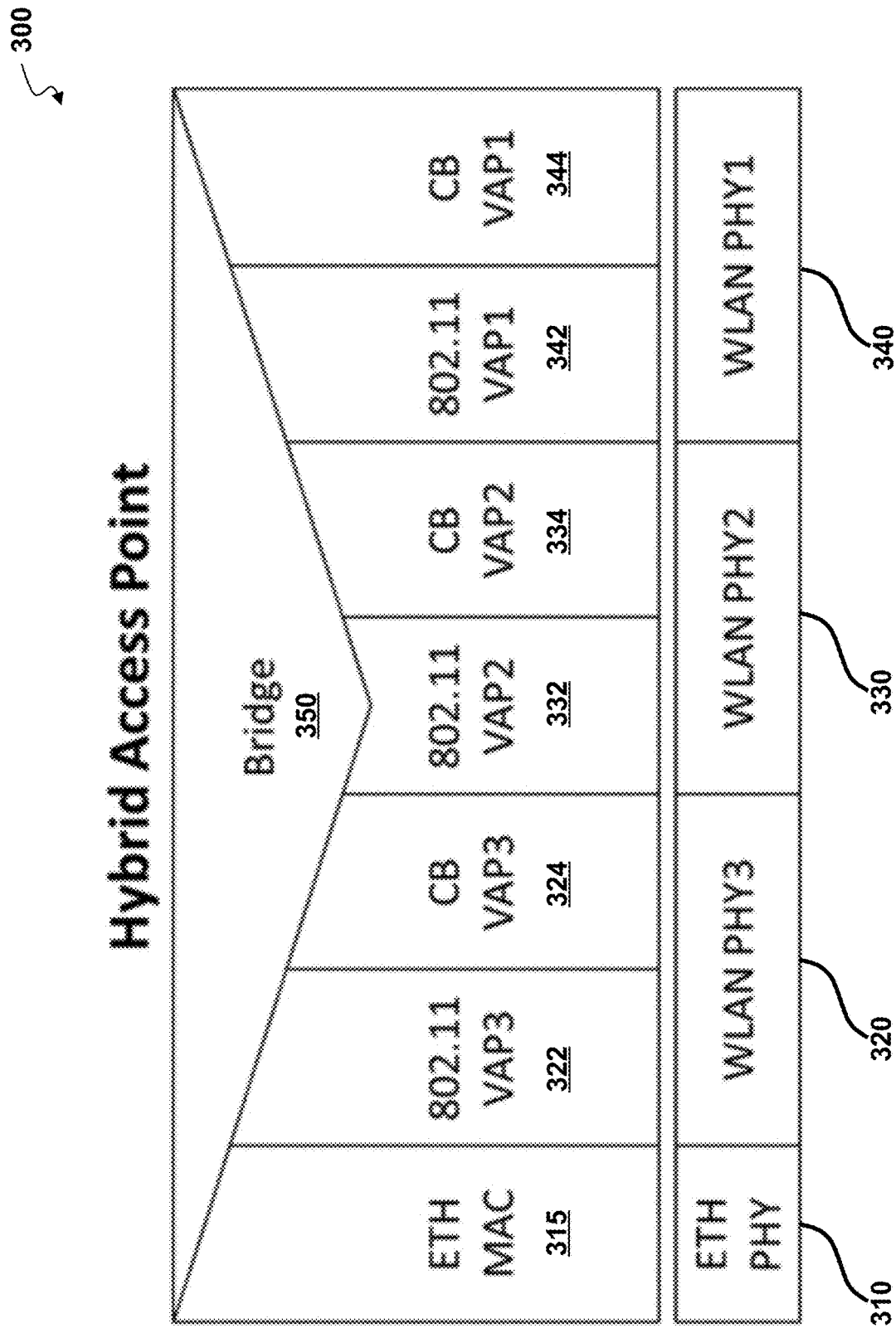
FIG. 3 is a conceptual illustration of a hybrid access point device layout in accordance with an embodiment of the invention.

With reference to FIG. 3, a conceptual illustration of a hybrid access point 300 device layout in accordance with an embodiment of the invention is shown. In many embodiments, the hybrid access point 300 can include a physical Ethernet port 310 that connects the hybrid access point 300 to other devices such as a wireless controller (not shown). In a number of embodiments, the physical Ethernet port 310 can be associated with an Ethernet-based media access control (MAC) address 315. In more embodiments, each hybrid access point 300 can have a number of physical radios installed. By way of example and not limitation, the embodiment illustrated in FIG. 3 has three physical radios for use in wireless local area networks (WLANs) and are marked as WLAN PHY1 340, WLAN PHY2, 330 and WLAN PHY3, 320. Those skilled in the art will recognize that the number of installed radios can be adjusted based on the needs of the specific application, allowing for radios to be installed as expansions on existing units or through the linking of multiple units in a master/slave combination or other similar organization. In still more embodiments, each physical radio 320, 330, 340 may transmit and receive wireless signals between the hybrid access point 300 and one or more user devices to communicate over a network. The radios can be identical to the physical radios 120, 130, 140 which can utilize the Physical Layer of the 802.11 standard and can be configured to work on different channels in the 2.4 GHz and 5 GHz bands. In a wireless network topology, one or more of the physical radios 320, 330, 340, may be used to connect to other devices and networks instead of the traditional wired LAN connection 310. In even more embodiments, physical WLAN radios can be configured to have multiple virtual access points (VAPs) per physical radio. In additional embodiments, each VAP acts as a secondary or additional hotspot but can share a single radio between multiple VAPs. In still additional embodiments, each of a plurality of hybrid access point VAPs 322, 324, 332, 334, 342, 344 between hybrid access points can be configured with either the same service basic set identifier (BSSID), with unique BSSIDs, or with any combination of the two. By way of example and not limitation, the embodiment illustrated in FIG. 3 is configured such that certain VAPs 322, 332, 42 utilize the MAC layer of an 802.11 MCA standard and the remaining VAPs 324, 334, 344 utilize the MAC layer of a channel blanket SCA. A bridge 350 is utilized to connect all VAPs 322, 324, 332, 334, 342, 344 to the hybrid access point 300 Ethernet connection 310 via the Ethernet MAC 315. This connection can allow for the connection and communication between client devices connected to the hybrid access point 300 and other external devices and networks including the Internet.

It can be appreciated by those skilled in the art that because the 802.11 VAPs 322, 332, 342 and the hybrid access point VAPs 324, 334, 344 are tightly bonded to the 802.11 hardware 320, 330, 340, having both VAP types share a single physical device is a challenging task. In more embodiments, any changes to radio configuration done by one VAP type can affect the other type, especially when using a channel blanket setup which may require some major out-of-standard adjustment from the radio. In still more embodiments of the hybrid access point 300, any hardware access can take into account that a different VAP type may be using the same radio.

In such a hybrid setup, an embodiment could be utilized that allows for multiple access points to be placed in various areas in order to create an area of wireless signal coverage. Certain client devices may be configured to communicate through wireless networks by either SCA or MCA standards. Because each VAP 322, 324, 332, 334, 342, 344 can utilize either MCA or SCA, the large area covered by the hybrid access point 300 can include wireless network coverage for a wider array of client devices.

While a variety of hybrid access point systems and devices are described above with reference to FIG. 3, the specific configurations and process flows of the hybrid access point systems and devices are largely dependent upon the requirements of specific applications. For example, it can be appreciated by those skilled in the art that the exact size, transmission power, and structure can be adjusted and scaled based on the size, complexity, and/or area coverage needs of the users or clients. Additionally, the hybrid access point systems and devices can run entirely on a single consumer device or can be distributed over many devices, perhaps all utilized by the same wireless network administrator to provide a seamless for client device usage. A more detailed discussion of the multi-architecture hybrid signal coverage is below.

Figure 4:
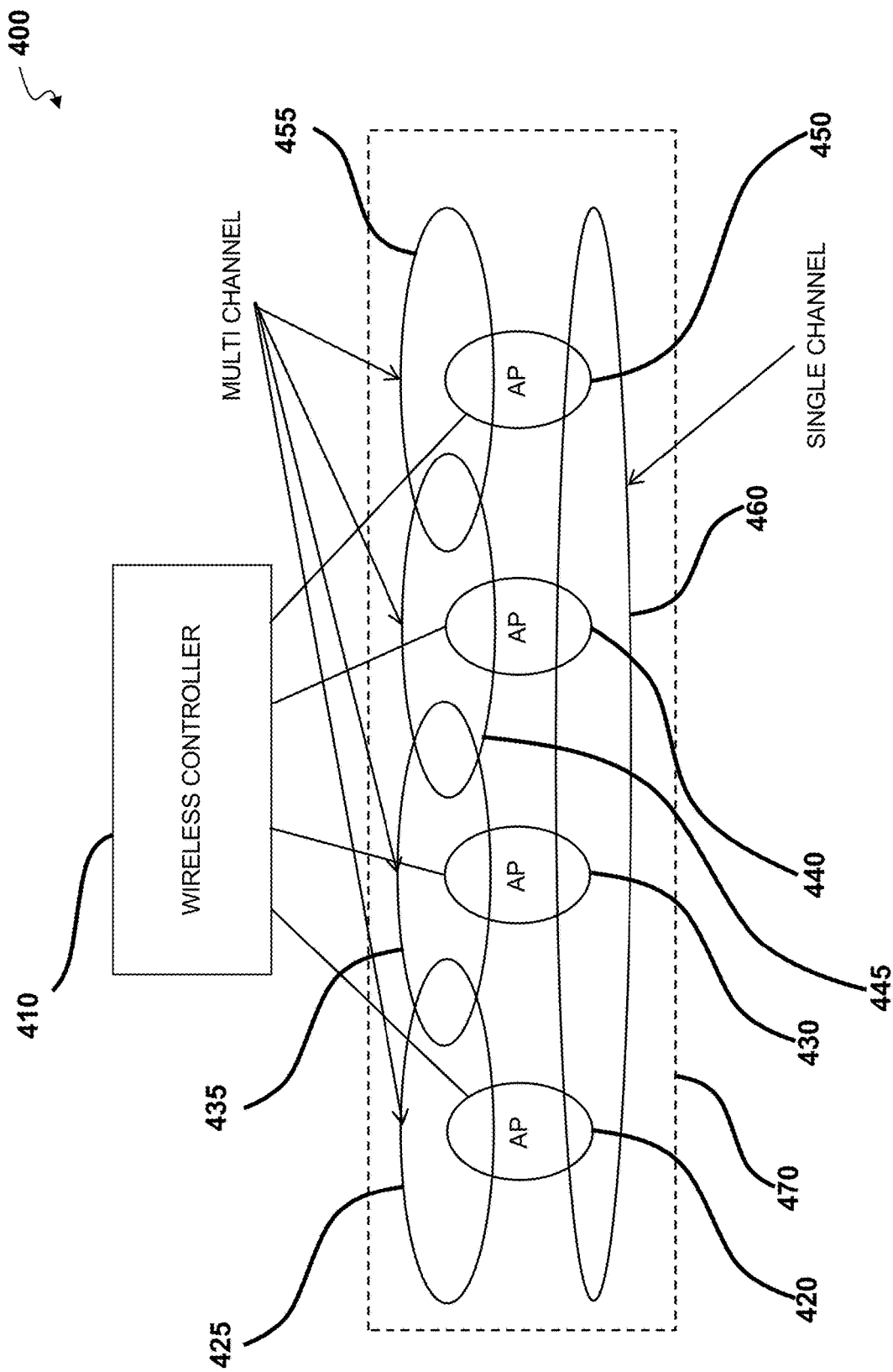
FIG. 4 is a conceptual illustration of a deployment of a hybrid access point system in accordance with an embodiment of the invention.

With reference to FIG. 4, a conceptual illustration of a deployment of a hybrid access point system 400 in accordance with an embodiment of the invention is shown. In many embodiments, the hybrid access point system 400 comprises multiple hybrid access points. By way of example and not limitation, the embodiment of FIG. 4 depicts four hybrid access points 420, 430, 440, and 450 connected by a wireless controller 410. In a number of embodiments, each access point 420, 430, 440, 450 may be configured to provide both an SCA 460 wireless signal and a plurality of MCA 425, 435, 445, 455 wireless signals. A combined MCA and SCA coverage 470 allows for a larger variety of client devices to utilize the same network without having to deploy multiple access points for both SCA and MCA setups. A wireless device moving across the combined MCA and SCA coverage 470 may have to connect and disconnect between MCA 425, 435, 445, 455 if in MCA or can stay connected to SCA 460 with SCA. If the device supports fast roaming such as 802.11 k/r/v, the device may choose MCA but may otherwise determine that SCA is a better choice under the circumstances. Moreover, in certain embodiments, if the device is mostly stationary it may be better to stay connected to one of the multi-channel VAPs without the need for roaming.

Figure 5:
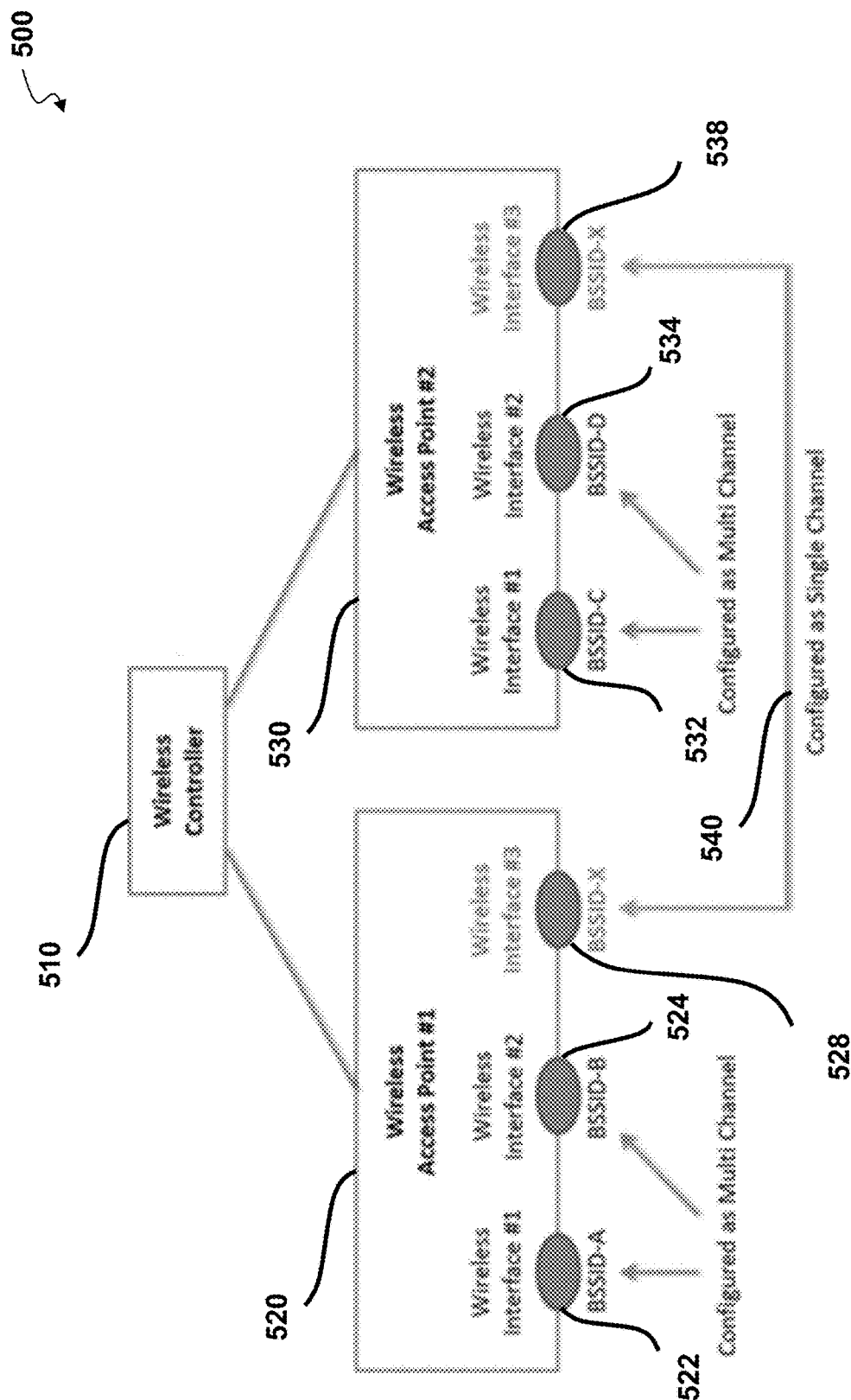
FIG. 5 is a conceptual illustration of a hybrid access point system with wireless interfaces in accordance with an embodiment of the invention.

With reference to FIG. 5, a conceptual illustration of a hybrid access point system 500 with wireless interfaces in accordance with an embodiment of the invention is shown. In many embodiments, multiple hybrid access points 520, 530 are utilized in conjunction to form a WLAN network. In a number of embodiments, the hybrid access points 520, 530 are connected to a wireless controller 510. In more embodiments, the connection between the wireless controller 510 and the hybrid access points 520, 530 may be achieved through a physical Ethernet cable between the wireless controller 510 and the hybrid access points 520, 530. In still more embodiments, a first hybrid access point 520 can be configured to have multiple wireless interfaces 522, 524, 528. In additional embodiments, the access point wireless interfaces 522, 524, 528 (as well as a plurality of additional access point wireless interfaces 532, 534, 538) may be configured for both SCA and MCA setups. By way of example and not limitation, the embodiment depicted in FIG. 5 comprises two wireless interfaces 522, 524 configured for MCA and a single wireless interface 528 configured for SCA. Additionally, the second hybrid access point 530 may also have two wireless interfaces 532, 534 configured for MCA and a single wireless interface 538 configured for SCA. In further embodiments, the SCA wireless interfaces 528, 538 may be configured to have the same basic service set identifier (BSSID) so that they are viewed by client devices as being associated with the same network.

While a variety of hybrid access point systems and devices are described above with reference to FIGS. 4-5, the specific configurations and process flows of the hybrid access point systems and devices are largely dependent upon the requirements of specific applications. For example, it can be appreciated by those skilled in the art that the exact number of devices and/or access points can be adjusted and scaled based on the size, complexity, and/or area coverage needs of the users or clients. Additionally, the hybrid access point systems and devices can run entirely on a single consumer device or can be distributed over many devices, perhaps all utilized by the same wireless network administrator to provide a seamless mobility for client device usage. A more detailed discussion of the multi-architecture hybrid device structure and message processing is below.

Figure 6:
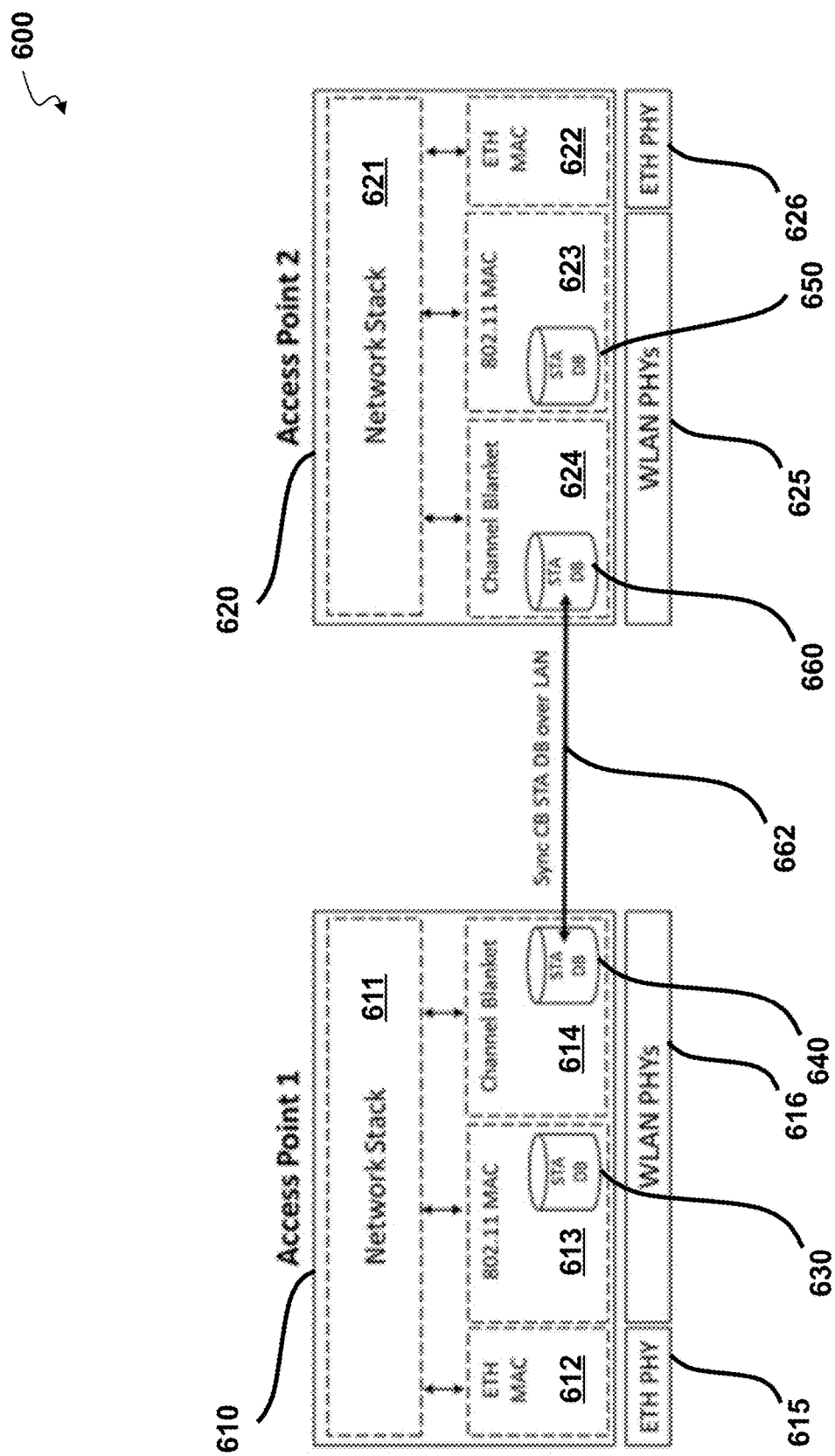
FIG. 6 is a conceptual illustration of the internal systems of hybrid access points in accordance with an embodiment of the invention.

With reference to FIG. 6, a conceptual illustration of internal systems of hybrid access points 600 in accordance with an embodiment of the invention is shown. In a number of embodiments, two hybrid access points 610, 620 are deployed as part of a network. In many embodiments, each hybrid access point 610, 620 may include a physical Ethernet port 615, 622 in communication with an Ethernet MAC 612, 622, at least one physical WLAN radio 616, 625 that may be in communication with an 802.11 MCA application 613, 623 and/or a channel blanket SCA application 614, 624. By way of example, Ethernet ports 615, 622 are described as wired LAN devices, but could be replaced with a wireless LAN device in mesh, wireless distribution system (WDS), or similar wireless network topologies. In still more embodiments, each hybrid access point 610, 620 may contain a network stack 611, 621 that may be in communication with the Ethernet MAC 612, 626, the MCA application 613, 623, and/or the SCA application 614, 624. In still further embodiments, each MCA application 613, 623, may contain a respective station database (STA DB) 630, 650. In still yet further embodiments, the MCA STA DBs 630, 650 may contain data of what client devices have been allowed to communicate with the hybrid access point 610, 620 and/or to communicate with other outside networks including, but not limited to, the Internet. Similarly, in additional embodiments, each SCA channel blanket SCA application 614, 624 may also contain an STA DB 640, 660 that may contain information related to client devices allowed to communicate with the hybrid access points 610, 620. In still additional embodiments, the STA DBs 640, 660 of the channel blanket SCA applications 614, 624 may also be in communication with each other. In yet additional embodiments, the communication between the SCA STA DBs 640, 660 may be achieved via a local area network (LAN) link 662 between the hybrid access points 610, 620. Link 662 may be established over a wired network topology using 615, 626 or over wireless network topology using physical WLAN radios 616, 625.

Figure 7:
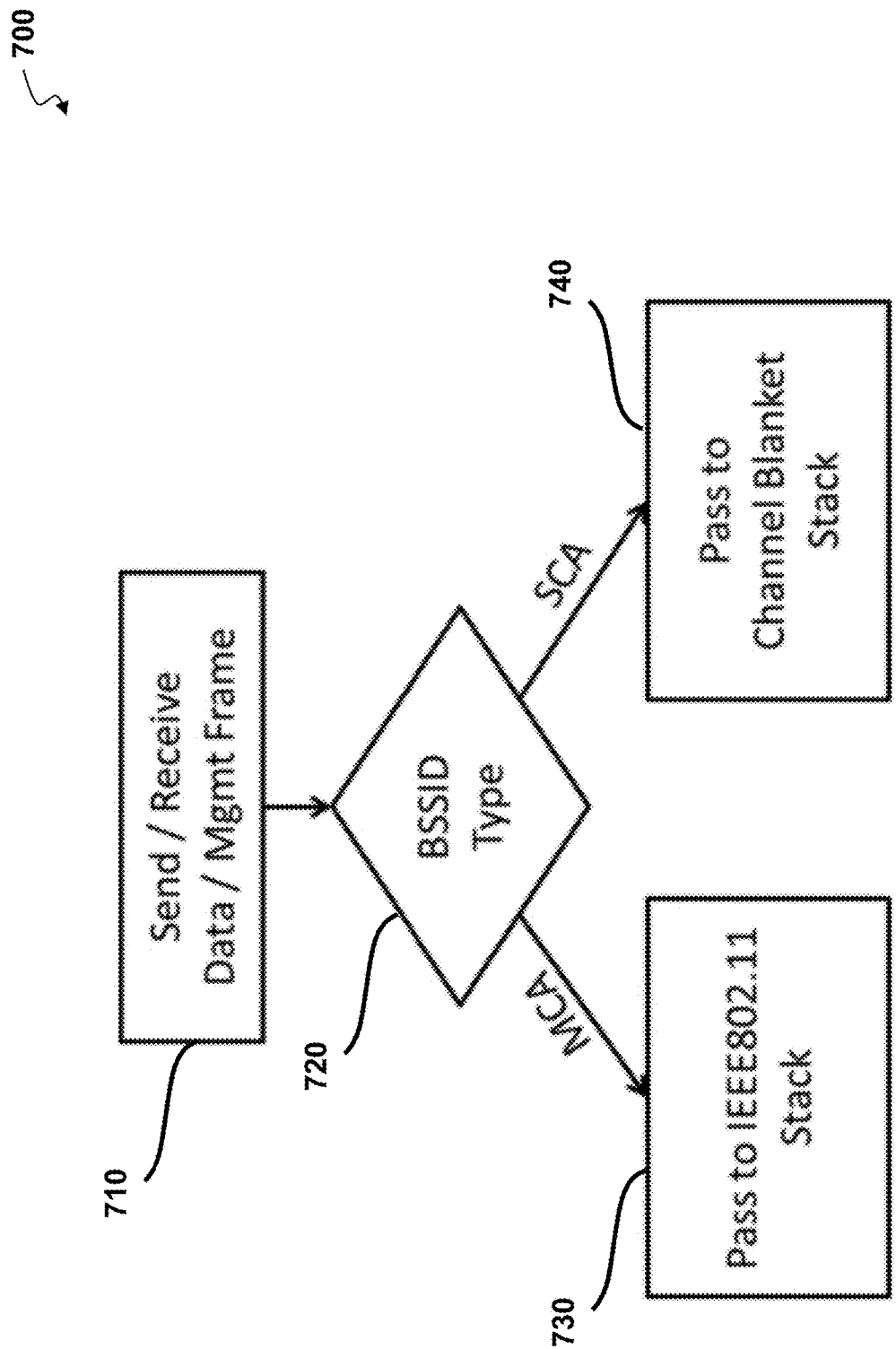
FIG. 7 is a flowchart of frame flow management in hybrid access point systems in accordance with an embodiment of the invention.

With reference to FIG. 7, a flowchart of frame flow management in hybrid access point systems in accordance with an embodiment of the invention is shown. In many embodiments, wireless data in the form of frames may be sent and/or received by the hybrid wireless access point. In a number of embodiments, the sent and/or received frames may need to be parsed by the hybrid access point as they could be received from or sent to client devices that are connected via an MCA setup or an SCA setup. In more embodiments, a process 700 for receiving data and/or management frames begins with receiving 710 the data/management frame at the hybrid access point. In response to receiving a frame, the process 700 may then determine 720 the BSSID type to be either an MCA or SCA type. In further embodiments, in response to a received data frame being determined to be sent to an MCA BSSID, the process 700 may pass 730 the received frame to the IEEE 802.11 stack for processing by the MCA application. Similarly, in additional embodiments, in response to a received frame being determined to be sent to an SCA BSSID, the process 700 may pass 740 the received frames to the channel blanket stack for processing by the SCA application.

In such a hybrid setup, an embodiment could be utilized that allows for a wireless device to exchange data with a wired device. When a wireless device connects the hybrid access point, it may choose a single SCA or MCA VAP to connect to and can go through an association process. In a number of embodiments, the device will send at least one management frame to the VAP which may include the BSSID of the VAP. The frames may be received by the appropriate radio and use the BSSID in the frame to determine how to process frame. In response to an uplink management frame, at least one management frame may be sent back to the device to complete the handshake. Once the association process is completed, the device information may be saved in the station database which can bind the device to the selected VAP.

Figure 8:
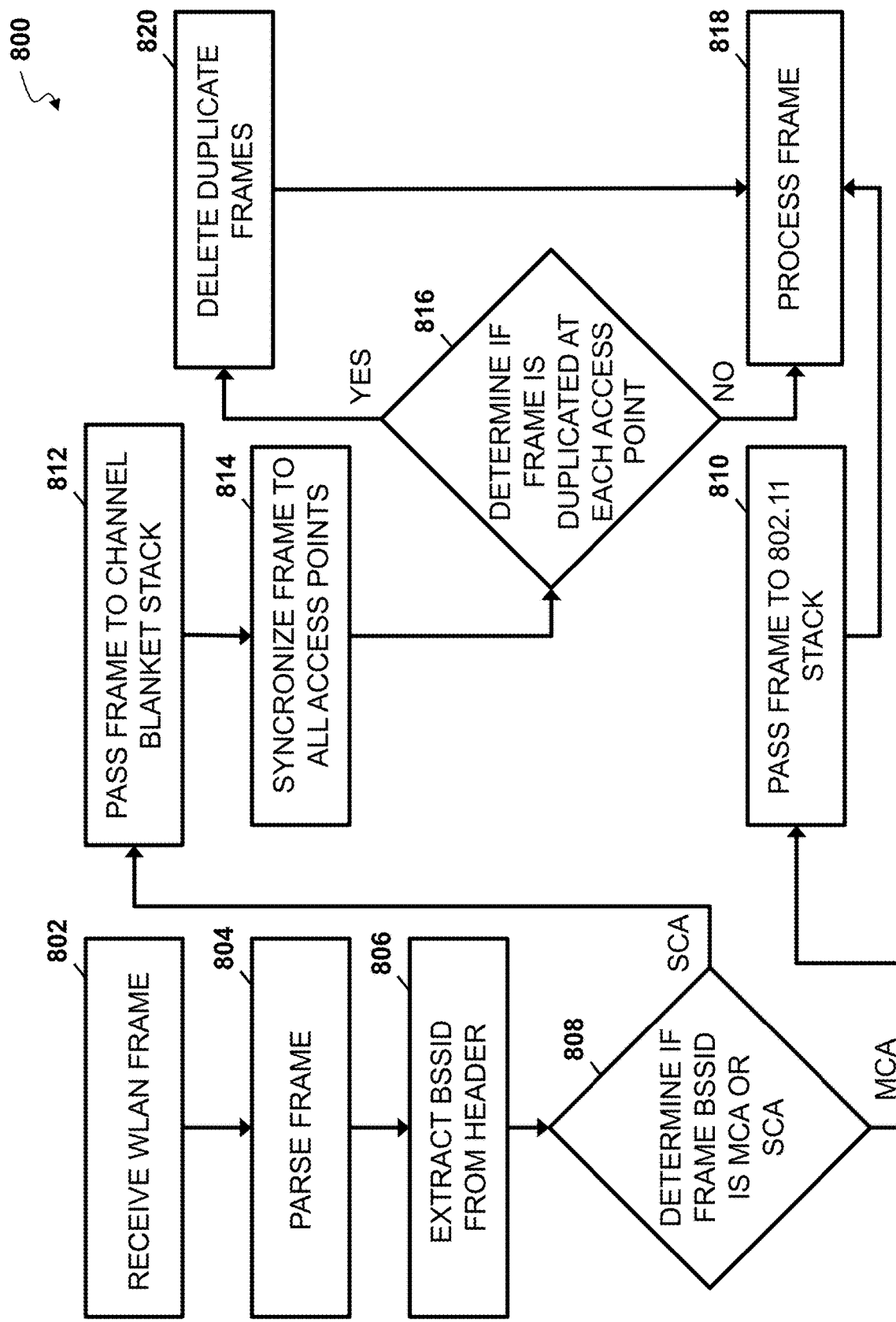
FIG. 8 is a flowchart of a process for receiving frames in hybrid access point systems in accordance with an embodiment of the invention.

With reference to FIG. 8, a flowchart of a process for receiving frames in hybrid access point systems in accordance with an embodiment of the invention is shown. In many embodiments, the process 800 may begin by receiving 802 a frame from a wireless client device. In response to receiving a frame, the process 800 may parse 804 the frame in certain embodiments. In a number of embodiments, the parsing 804 of the frame may include extracting 806 the BSSID from the 802.11 header. In more embodiments, the BSSID may be utilized to determine 808 if the received frame is for an MCA or SCA VAP. In additional embodiments, if a frame is determined 808 to be for an MCA VAP, the frame can be passed 810 to the 802.11 stack in the AP for processing 818 of the frame. In further embodiments, if a frame is determined 808 to be for an SCA VAP, the frame can be passed 812 to the channel blanket stack. In still further embodiments, multiple hybrid access points may receive the same frame. In yet further embodiments, the received frame can be synchronized 814 across all of the access points in the system. In response to receiving a synchronized frame, yet still further embodiments the process 800 may determine 816 if the received frame is a duplicate at each access point. In still additional embodiments, when a frame is determined to be a duplicate at an access point, the process 800 can delete 820 duplicate frames from the system. In yet additional embodiments, if a frame is determined 816 to not be a duplicate frame, the process 800 can then process 818 the frame as needed.

Figure 9:
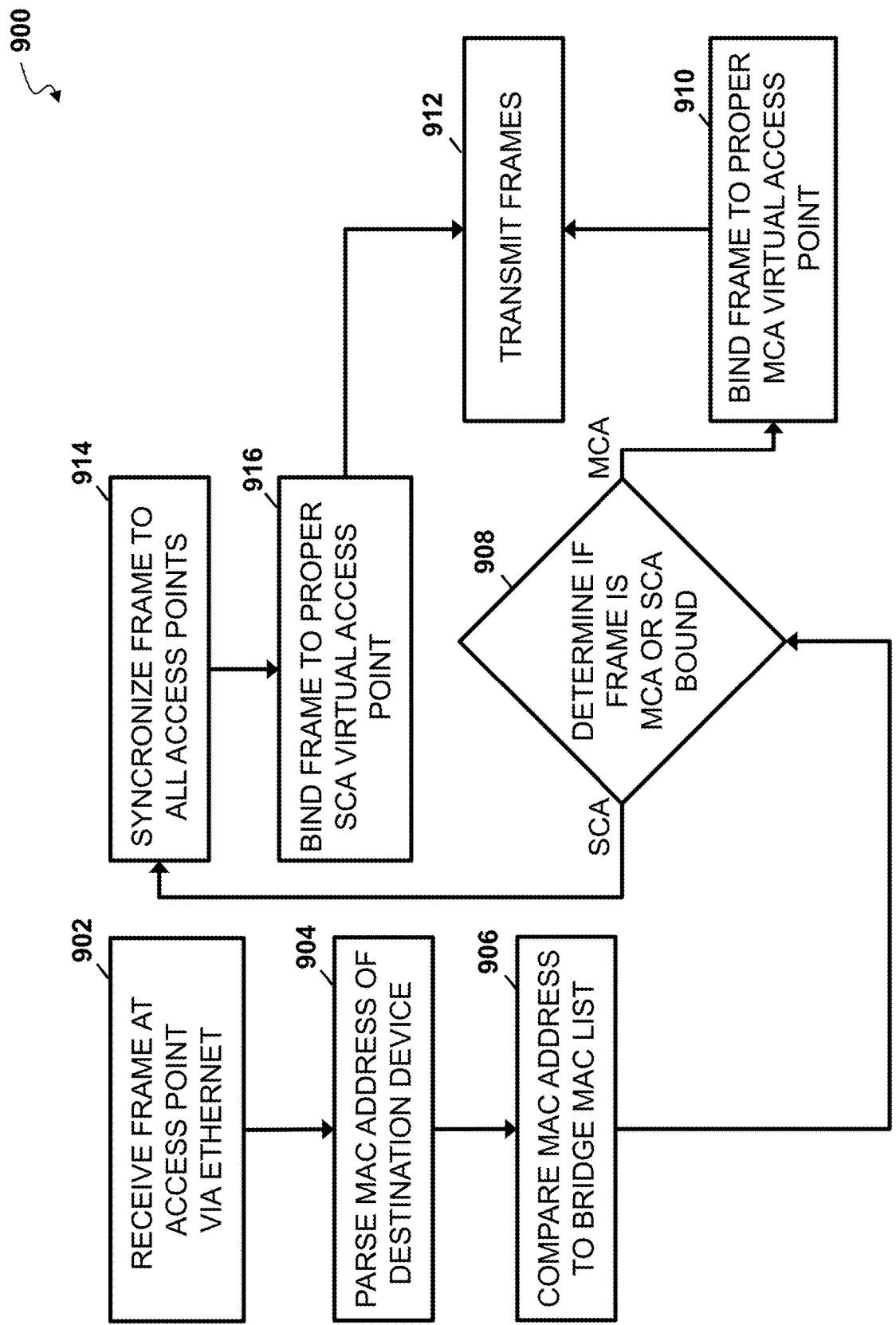
FIG. 9 is a flowchart of a process for transmitting frames in hybrid access point systems in accordance with an embodiment of the invention.

With reference to FIG. 9, a flowchart of a process for transmitting frames in hybrid access point systems in accordance with an embodiment of the invention is shown. In many embodiments, the process 900 may begin by receiving 902 a frame from another interface such as, but not limited to, a local area network (LAN) or other VAP in the system. In a number of embodiments, the received frame may be received via a physical Ethernet connection to an outside network such as, but not limited to, the Internet. In response to receiving a frame for transmission, the process 900 may parse 904 the MAC address of the frame in certain embodiments. In a number of embodiments, the parsing 904 of the frame may include finding the wireless device with the Ethernet destination address. In more embodiments, the process 900 may compare the mac address of a frame for transmission to a MAC address stored in a station database or bridge MAC list. In certain embodiments, the stored MAC address in a MAC list may allow for the determination 908 if the frame for transmission should be passed to a device bound for MCA or SCA architecture. In still more embodiments, in response to the determination 908 of a frame bound for MCA, the process 900 can then bind 910 the frame to the proper MCA VAP for transmission to the wireless device. In still further embodiments, the bound MCA frame can then be transmitted 912 to the wireless device. In yet more embodiments, the process 900 can synchronize 914 the frame for transmission between all access points in response to the frame being determined 908 to be for an SCA setup. In additional embodiments, the process 900 can then bind 916 the frame to proper SCA VAP for transmission. In yet additional embodiments, the bound SCA frame can be transmitted 912 to the wireless device.

While a variety of hybrid access point structures and processes are described above with reference to FIGS. 6-9, the specific configurations and process flows of the hybrid access point structures and processes for receiving and transmission of frames are largely dependent upon the requirements of specific applications. For example, it can be appreciated by those skilled in the art that the exact structure or components of the hybrid access points can be adjusted and/or modified based on the size, complexity, and/or area coverage needs of the users or clients. Additionally, the hybrid access point processing can be done at the hybrid access point and/or at the wireless controller based on the processing and/or size capabilities of the devices. A more detailed discussion of the multi-architecture hybrid device channel layout across multiple hybrid access points is below.

Figure 10:
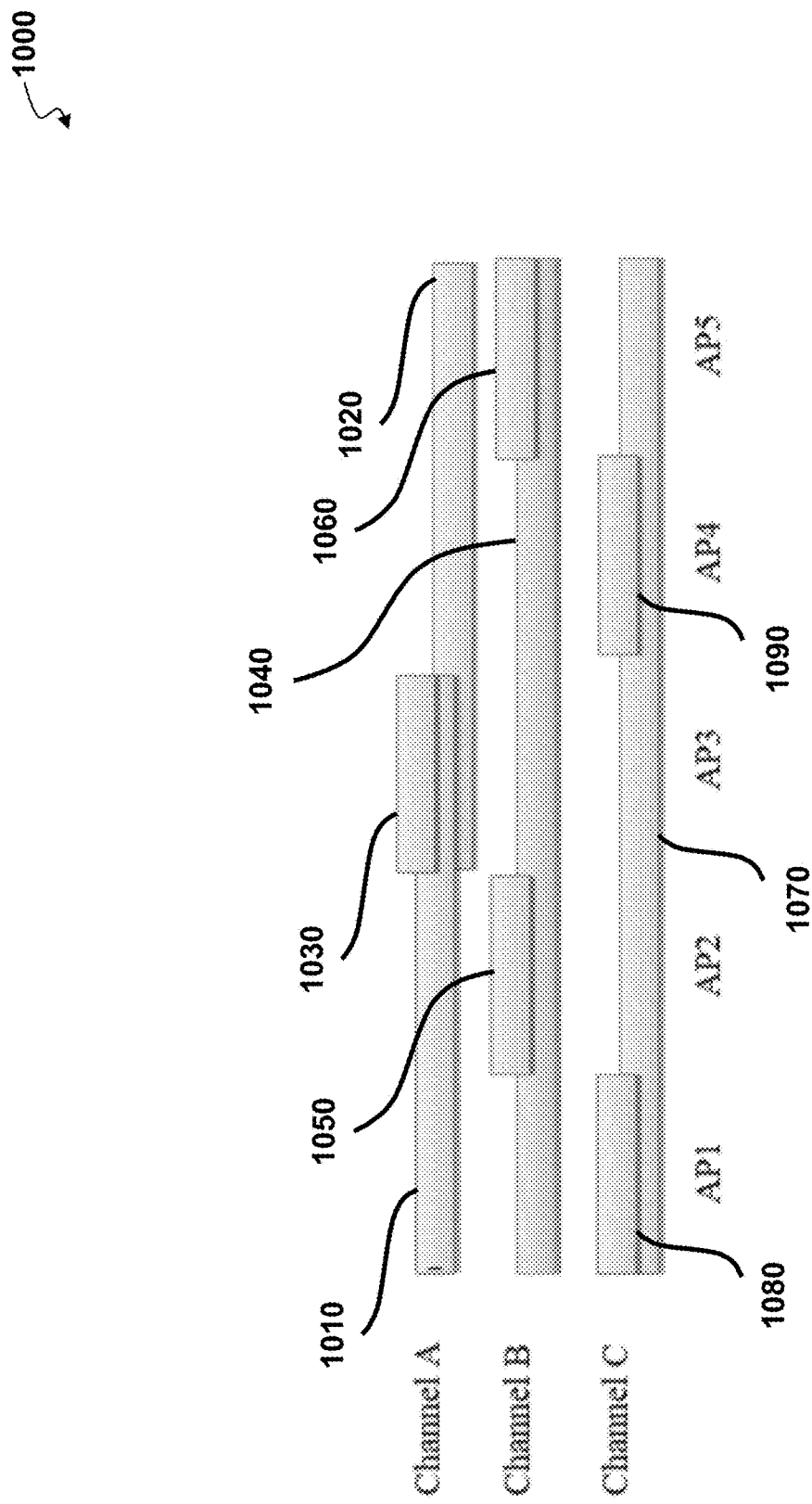
FIG. 10 is a conceptual illustration of wireless channel allocation with hybrid access points in accordance with an embodiment of the invention.

With reference to FIG. 10, a conceptual illustration of wireless channel allocation with hybrid access points 1000 in accordance with an embodiment of the invention is shown. In many embodiments, a hybrid access point system can utilize multiple hybrid access points over multiple channels in a large area. By way of example and not limitation, an embodiment depicted in FIG. 10 includes five hybrid access points (AP1, AP2, AP3, AP4, and AP5) that utilize three channels of wireless communication (Channels A, B, and C). Each box in FIG. 10 represents a basic service set (BSS) as part of MCA or SCA. In a number of embodiments, each AP utilizes all three channels for either MCA or SCA setups. By way of example and not limitation, AP1 utilizes SCA for channels A 1010 and B 1040, and both MCA 1080 and SCA 1070 for channel C. Similarly, AP2 is depicted as utilizing SCA for channel A 1010, and channel C 1070, and both MCA 1050 and SCA 1040 on channel B. Channel A is depicted in this embodiment as being utilized an SCA signal 1010 over AP1, AP2, and AP3 and a second SCA signal 1020 over AP3, AP4, and AP5, while also being utilized for an MCA signal 1030 on AP3. Likewise, in an example embodiment, channel B is being utilized for an SCA signal 1040 over all five APs while an MCA signal 1050, 1060 is being transmitted by AP2, and AP5. Finally, channel C is being utilized for an SCA signal 1070 by all five APs and for an MCA signal 1080, 1090 on AP1 and AP4 respectively.

While a variety of hybrid access point wireless channel allocations are described above with reference to FIG. 10, the specific configurations and utilization of the hybrid access point systems are largely dependent upon the requirements of specific applications. For example, it can be appreciated by those skilled in the art that the number of access points and/or utilized channels can be adjusted and/or modified based on the size, complexity, and/or area coverage needs of the users or clients. A more detailed discussion of the multi-architecture hybrid access point configuration points is below.

Figure 11:
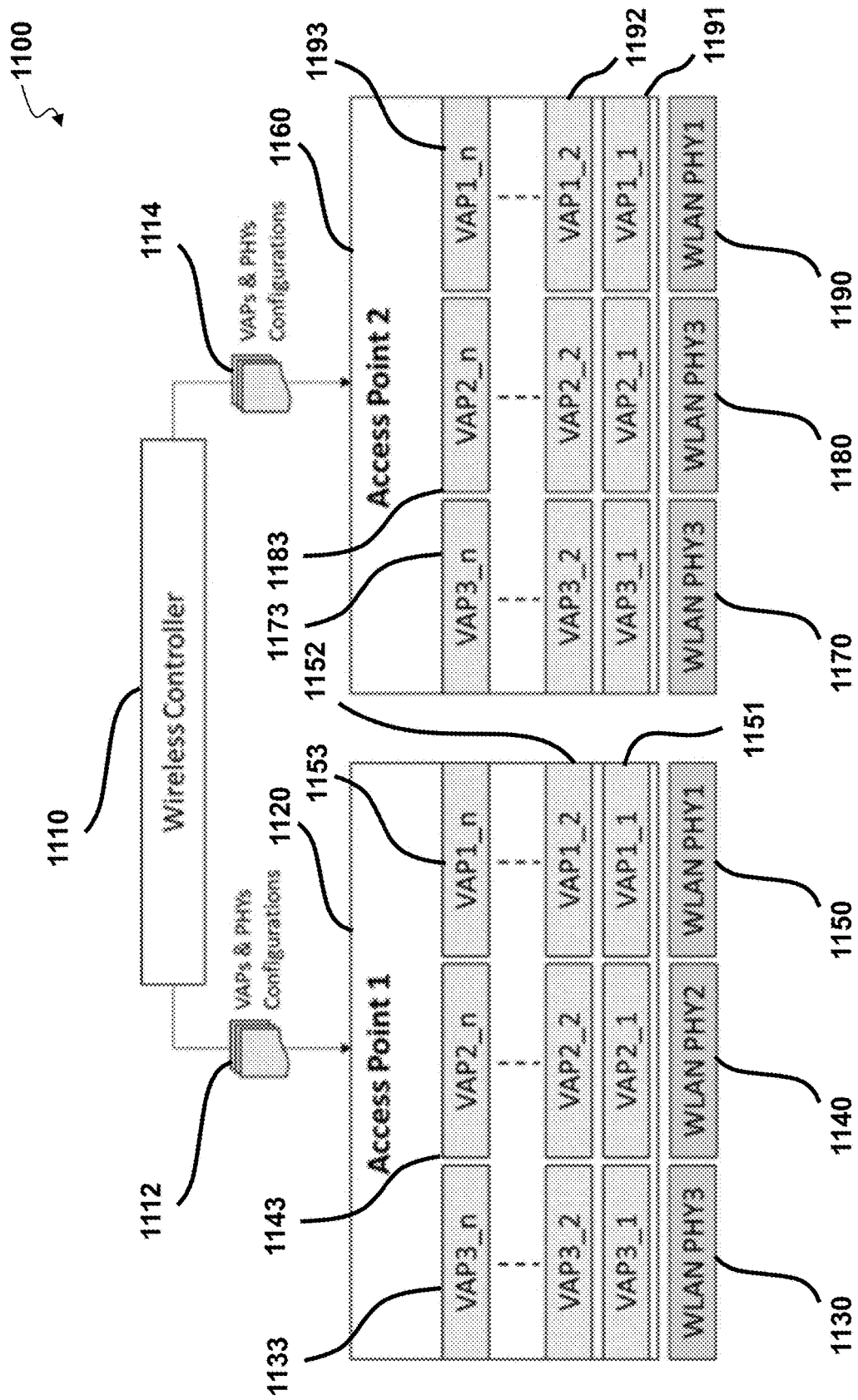
FIG. 11 is a conceptual illustration of a hybrid access point system configuration in accordance with an embodiment of the invention.

With reference to FIG. 11, a conceptual illustration of a hybrid access point system 1100 configuration in accordance with an embodiment of the invention is shown. In a number of embodiments, the hybrid access point system 1100 can include multiple hybrid access points 1120, 1160, which may be connected to a wireless controller 1110. In more embodiments, each hybrid access point 1120, 1160 may contain a plurality of physical WLAN radios 1130, 1140, 1150, 1170, 1180, 1190. In further embodiments, each of the plurality of physical WLAN radios 1130, 1140, 1150, 1170, 1180, 1190 may be configured to have multiple VAPs. Each VAP can be configured for either MCA or SCA signals. By way of example and not limitation, the first WLAN radio 1150 in the first hybrid access point 1120 may contain a first VAP 1151, a second VAP 1152 and any number of VAPs as needed up until the nth VAP 1153. Similarly, in additional embodiments, the second and third WLAN radio 1140, 1130 can also be configured with multiple VAPs up until an nth VAP 1143, 1133. Likewise, by way of example and not limitation, the depicted embodiment has a second access point 1160 which is also configured with multiple physical WLAN radios 1170, 1180, 1190 which are themselves configured with multiple VAPs per radio 1191, 1192 up until an nth VAP 1193, 1183, 1173 depending on the application needed. In still additional embodiments, the VAPs 1133, 1143, 1151, 1152, 1153, 1173, 1183, 1191, 1192, 1193 can be utilized for either SCA or MCA signals based on the needs of the network administrator. In yet additional embodiments, the hybrid access points 1120, 1160 may be configured from a central source. In still yet additional embodiments, the hybrid access points 1120, 1160 may be configured by a wireless controller 1110. In more additional embodiments, the wireless controller 1110 may configure the hybrid access points 1120, 1160 by transmitting a configuration file 1112, 1114 to each hybrid access point 1120, 1160. In still more additional embodiments, the configuration files 1112, 1114 are generated by the wireless controller 1110 in response to an input by a user regarding the specifications of the wireless network deployment desired.

Figure 12:
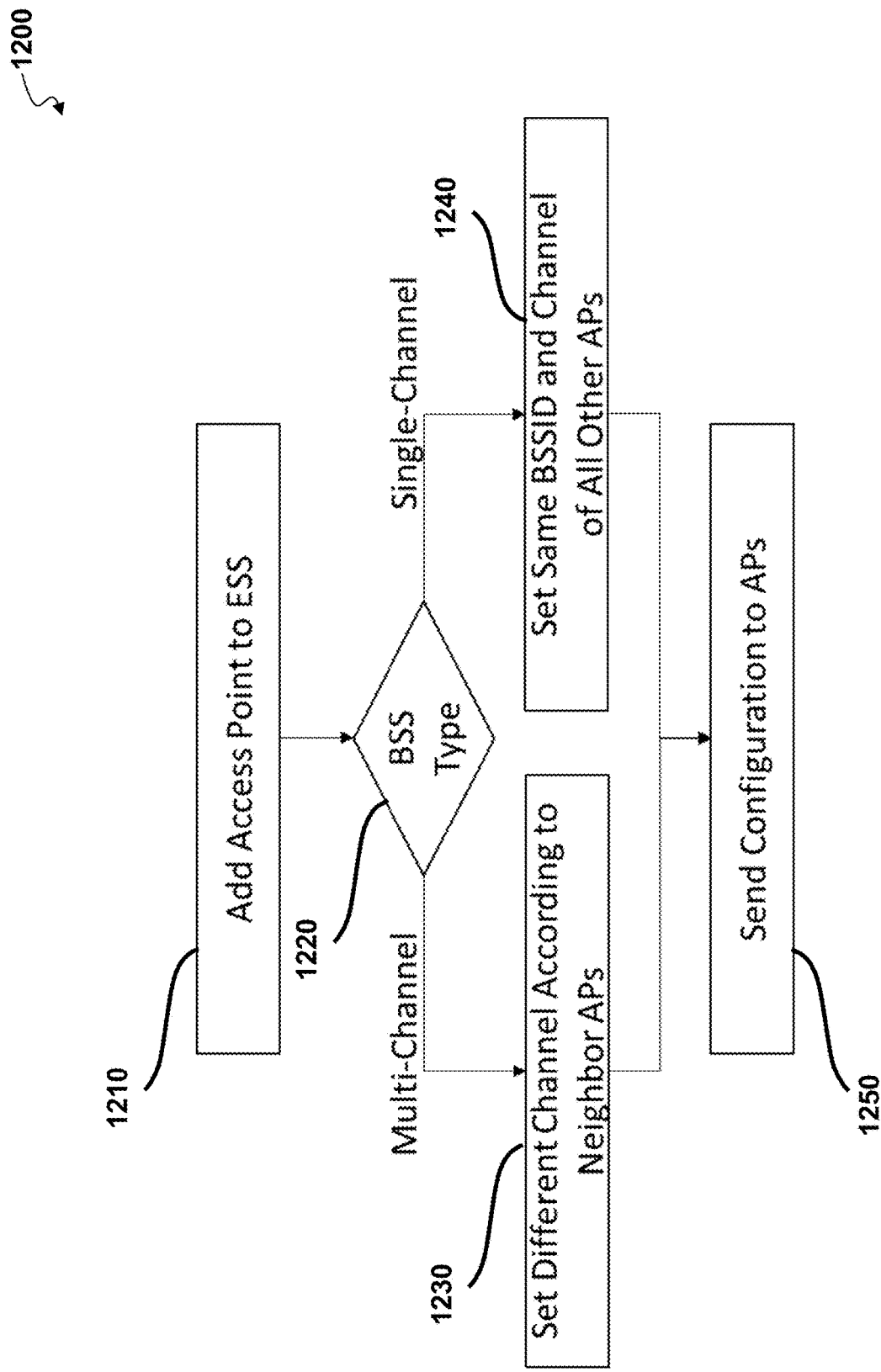
FIG. 12 is a flowchart of a process for configuring a hybrid access point system based in response to a newly added access point in accordance with an embodiment of the invention.

With reference to FIG. 12, a flowchart of a process 1200 for configuring a hybrid access point system based in response to a newly added access point in accordance with an embodiment of the disclosed system and method is shown. In many embodiments, a hybrid access point system may have multiple access points being controlled by a centralized wireless controller. In a number of embodiments, the network deployment may be expanded by adding an additional hybrid access point to the current network deployment. In further embodiments, the process 1200 may begin by adding 1210 an additional hybrid access point to the extended service set (ESS). In still further embodiments, in response to a new hybrid access point being added 1210 to the ESS, the basic service set (BSS) may be determined 1220. In yet further embodiments, the determination may be either MCA, or SCA. In still further embodiments, in response to the determination 1220 of an MCA setup, the process 1200 may set a different channel according to the status of the neighboring access points 1230. Conversely, in other embodiments, the process 1200 may set the same BSSID and channel of the newly added hybrid access point to all of the other SCA APs already in the network 1240 in response to the determination 1220 of the BSS type of the newly added hybrid access point. In yet still further embodiments, the process 1200 may generate and send 1250 configuration files to all of the APs in the network in order to configure the network to function with the newly added hybrid access point. In additional embodiments, the process 1200 may be carried out by the wireless controller in the hybrid access point system.

While a variety of processes and methods for configuring and adding in hybrid access points are described above with reference to FIGS. 11-12, the specific configurations of the hybrid access point systems are largely dependent upon the requirements of specific applications. For example, it can be appreciated by those skilled in the art that the addition of a hybrid access point can be to an existing system that does not presently have a hybrid access point.

Figure 13:
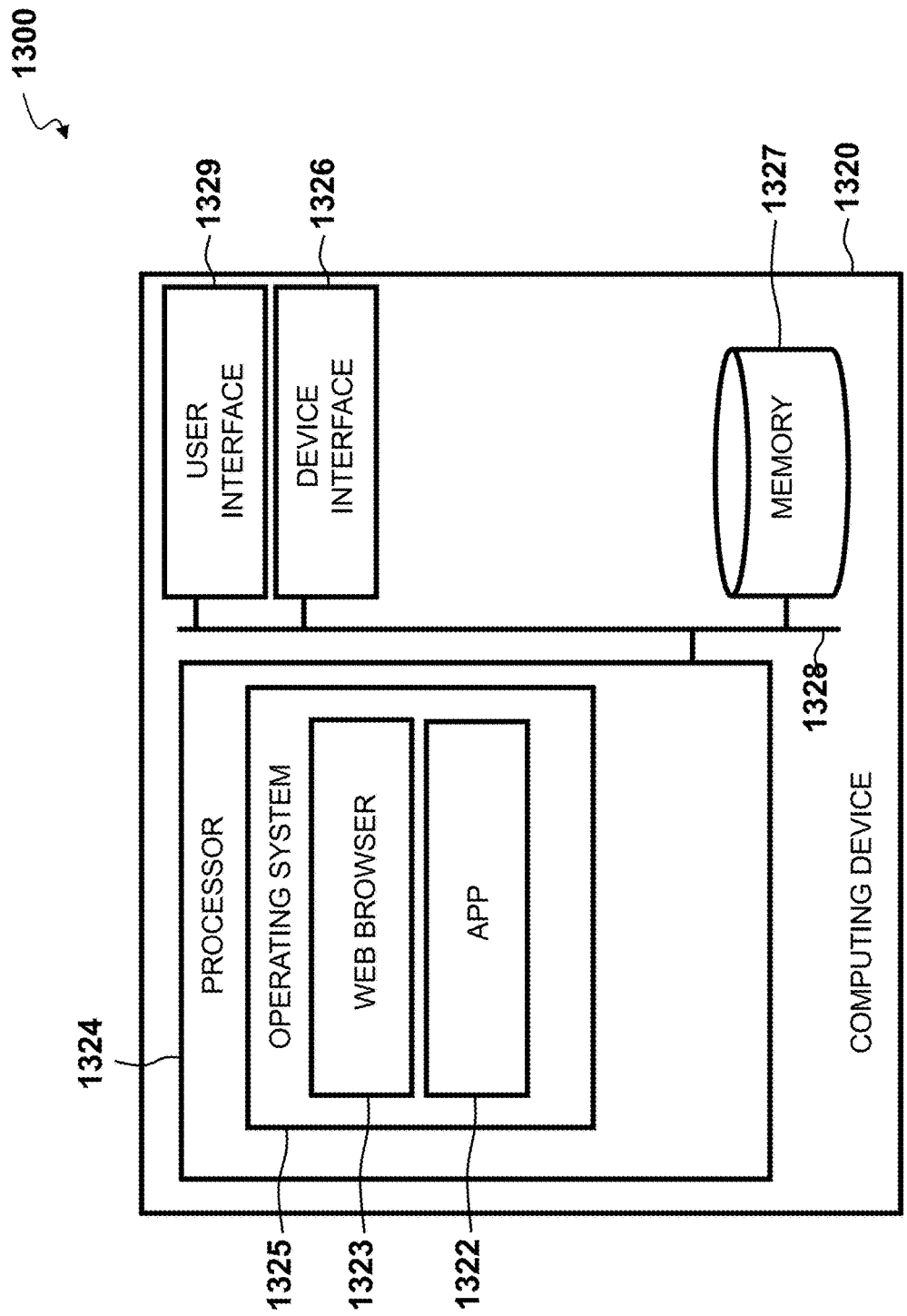
FIG. 13 illustrates an example top-level functional block diagram of a computing device embodiment.

FIG. 13 illustrates an example of a top-level functional block diagram of a computing device embodiment 1300. The example operating environment is shown as a computing device 1320 comprising a processor 1324, such as a central processing unit (CPU), addressable memory 1327, an external device interface 1326, e.g., an optional universal serial bus port and related processing, and/or an Ethernet port and related processing, and an optional user interface 1329, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 1328. In some embodiments, via an operating system 1325 such as one supporting a web browser 1323 and applications 1322, the processor 1324 may be configured to execute steps of a process establishing a communication channel and processing according to the embodiments described above.

System embodiments include computing devices such as a server computing device, a buyer computing device, and a seller computing device, each comprising a processor and addressable memory and in electronic communication with each other. The embodiments provide a server computing device that may be configured to: register one or more buyer computing devices and associate each buyer computing device with a buyer profile; register one or more seller computing devices and associate each seller computing device with a seller profile; determine search results of one or more registered buyer computing devices matching one or more buyer criteria via a seller search component. The service computing device may then transmit a message from the registered seller computing device to a registered buyer computing device from the determined search results and provide access to the registered buyer computing device of a property from the one or more properties of the registered seller via a remote access component based on the transmitted message and the associated buyer computing device; and track movement of the registered buyer computing device in the accessed property via a viewer tracking component. Accordingly, the system may facilitate the tracking of buyers by the system and sellers once they are on the property and aid in the seller's search for finding buyers for their property. The figures described below provide more details about the implementation of the devices and how they may interact with each other using the disclosed technology.

Figure 14:
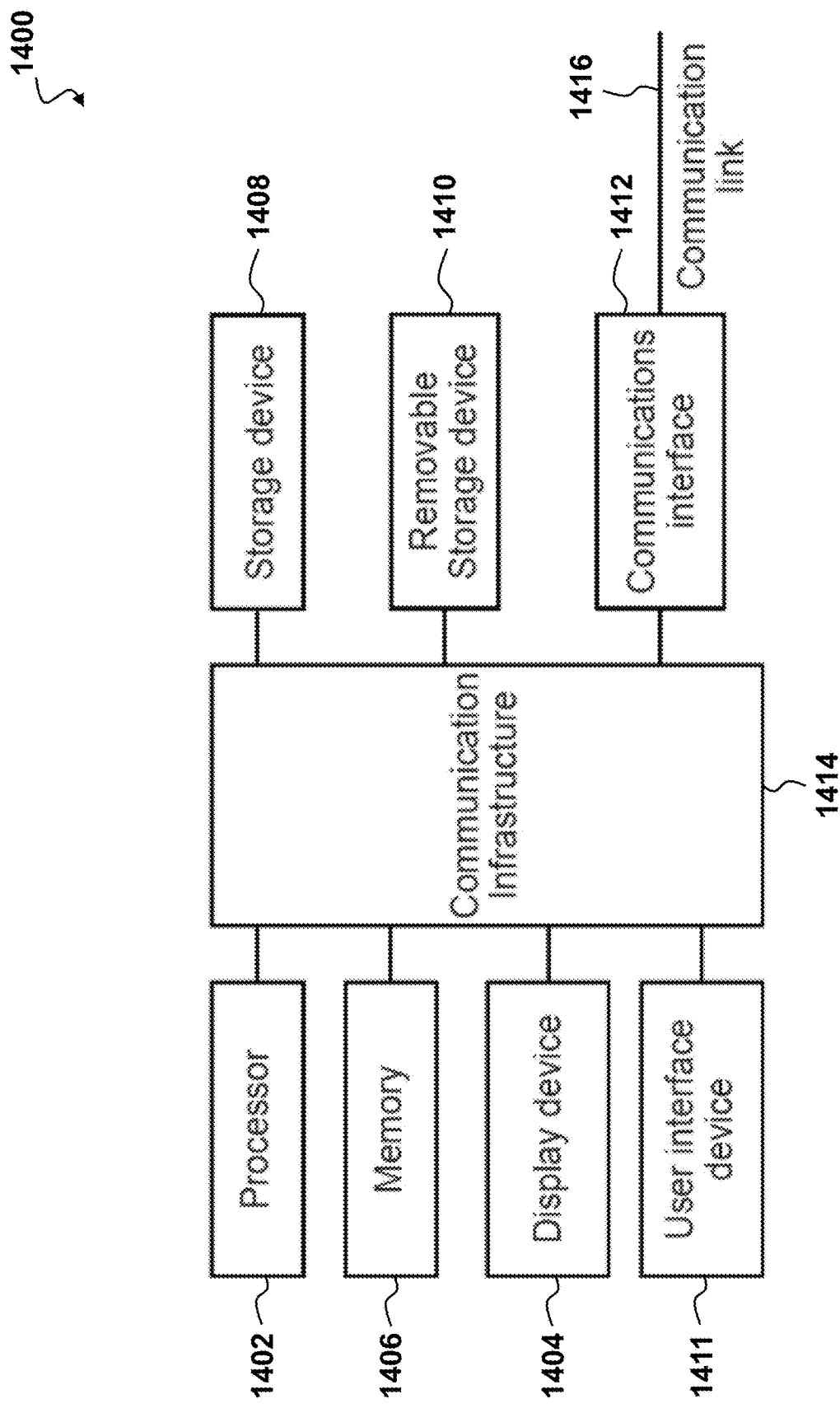
FIG. 14 shows a high-level block diagram and process of a computing system for implementing an embodiment of the system and process.

FIG. 14 is a high-level block diagram 1400 showing a computing system comprising a computer system useful for implementing an embodiment of the system and process, disclosed herein. Embodiments of the system may be implemented in different computing environments. The computer system includes one or more processors 1402, and can further include an electronic display device 1404 (e.g., for displaying graphics, text, and other data), a main memory 1406 (e.g., random access memory (RAM)), storage device 1408, a removable storage device 1410 (e.g., removable storage drive, a removable memory module, a magnetic tape drive, an optical disk drive, a computer readable medium having stored therein computer software and/or data), user interface device 1411 (e.g., keyboard, touch screen, keypad, pointing device), and a communication interface 1412 (e.g., modem, a network interface (such as an Ethernet card), a communications port, or a PCMCIA slot and card). The communication interface 1412 allows software and data to be transferred between the computer system and external devices. The system further includes a communications infrastructure 1414 (e.g., a communications bus, cross-over bar, or network) to which the aforementioned devices/modules are connected as shown.

Information transferred via communications interface 1414 may be in the form of signals such as electronic, electromagnetic, optical, or other signals capable of being received by communications interface 1414, via a communication link 1416 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 1412. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 15:
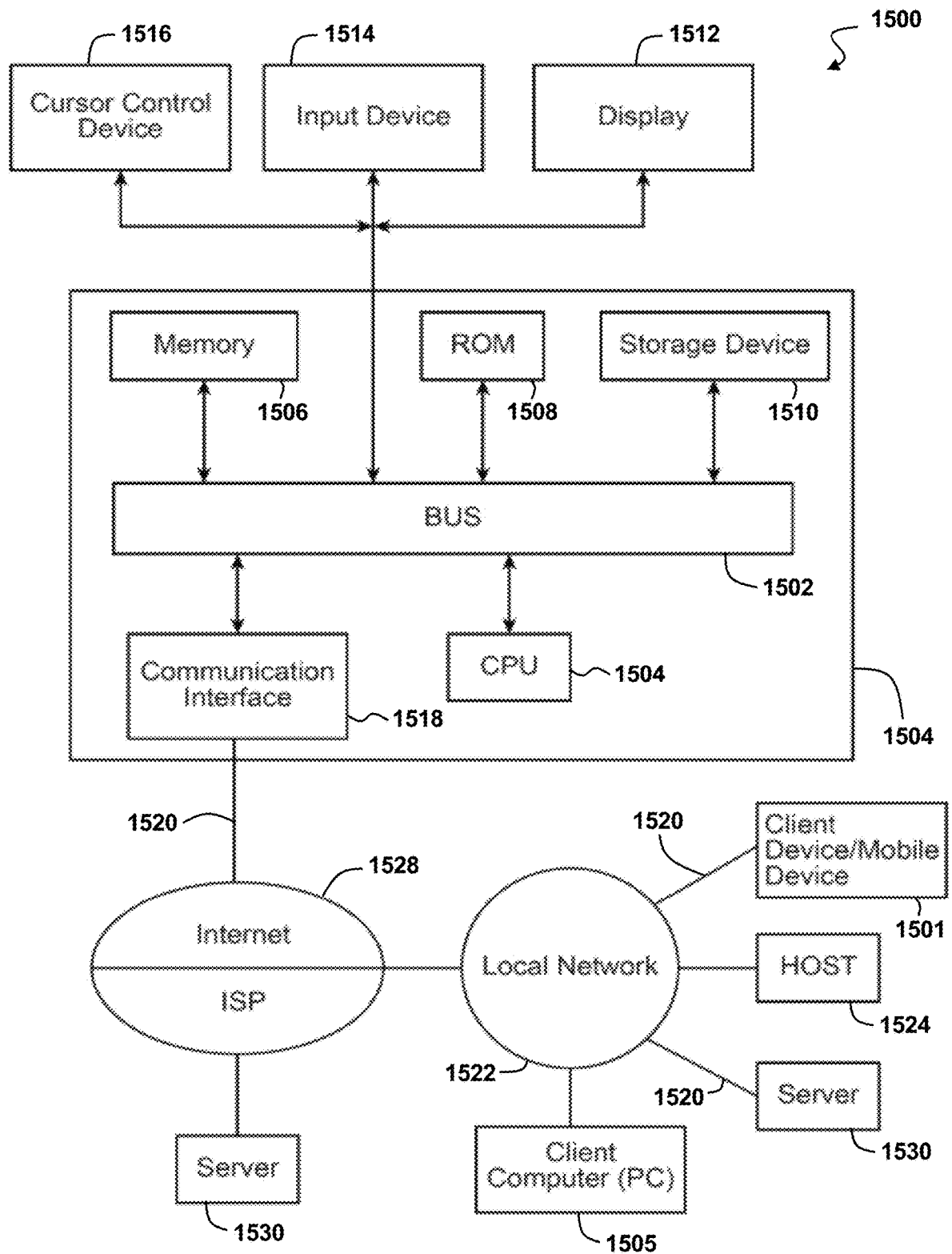
FIG. 15 shows a block diagram and process of an exemplary system in which an embodiment may be implemented.

FIG. 15 shows a block diagram of an example system 1500 in which an embodiment may be implemented. The system 1500 includes one or more client devices 1501 such as consumer electronics devices, connected to one or more server computing systems 1530. A server 1530 includes a bus 1502 or other communication mechanism for communicating information, and a processor (CPU) 1504 coupled with the bus 1502 for processing information. The server 1530 also includes a main memory 1506, such as a random access memory (RAM) or other dynamic storage device, coupled to the bus 1502 for storing information and instructions to be executed by the processor 1504. The main memory 1506 also may be used for storing temporary variables or other intermediate information during execution or instructions to be executed by the processor 1504. The server computer system 1530 further includes a read only memory (ROM) 1508 or other static storage device coupled to the bus 1502 for storing static information and instructions for the processor 1504. A storage device 1510, such as a magnetic disk or optical disk, is provided and coupled to the bus 1502 for storing information and instructions. The bus 1502 may contain, for example, thirty-two address lines for addressing video memory or main memory 1506. The bus 1502 can also include, for example, a 32-bit data bus for transferring data between and among the components, such as the CPU 1504, the main memory 1506, video memory and the storage 1510. Alternatively, multiplex data/address lines may be used instead of separate data and address lines.

The server 1530 may be coupled via the bus 1502 to a display 1512 for displaying information to a computer user. An input device 1514, including alphanumeric and other keys, is coupled to the bus 1502 for communicating information and command selections to the processor 1504. Another type or user input device comprises cursor control 1516, such as a mouse, a trackball, or cursor direction keys for communicating direction information and command selections to the processor 1504 and for controlling cursor movement on the display 1512.

According to one embodiment, the functions are performed by the processor 1504 executing one or more sequences of one or more instructions contained in the main memory 1506. Such instructions may be read into the main memory 1506 from another computer-readable medium, such as the storage device 1510. Execution of the sequences of instructions contained in the main memory 1506 causes the processor 1504 to perform the process steps described herein. One or more processors in a multi-processing arrangement may also be employed to execute the sequences of instructions contained in the main memory 1506. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 1504 for execution. Such a medium may take many forms, including but not limited to, non-volatile media, volatile media, and transmission media. Non-volatile media includes, for example, optical or magnetic disks, such as the storage device 1510. Volatile media includes dynamic memory, such as the main memory 1506. Transmission media includes coaxial cables, copper wire and fiber optics, including the wires that comprise the bus 1502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 1504 for execution. For example, the instructions may initially be carried on a magnetic disk of a remote computer. The remote computer can load the instructions into its dynamic memory and send the instructions over a telephone line using a modem. A modem local to the server 1530 can receive the data on the telephone line and use an infrared transmitter to convert the data to an infrared signal. An infrared detector coupled to the bus 1502 can receive the data carried in the infrared signal and place the data on the bus 1502. The bus 1502 carries the data to the main memory 1506, from which the processor 1504 retrieves and executes the instructions. The instructions received from the main memory 1506 may optionally be stored on the storage device 1510 either before or after execution by the processor 1504.

The server 1530 also includes a communication interface 1518 coupled to the bus 1502. The communication interface 1518 provides a two-way data communication coupling to a network link 1520 that is connected to the world wide packet data communication network now commonly referred to as the Internet 1528. The Internet 1528 uses electrical, electromagnetic or optical signals that carry digital data streams. The signals through the various networks and the signals on the network link 1520 and through the communication interface 1518, which carry the digital data to and from the server 1530, are exemplary forms or carrier waves transporting the information.

In another embodiment of the server 1530, interface 1518 is connected to a network 1522 via a communication link 1520. For example, the communication interface 1518 may be an integrated services digital network (ISDN) card or a modem to provide a data communication connection to a corresponding type of telephone line, which can comprise part of the network link 1520. As another example, the communication interface 1518 may be a local area network (LAN) card to provide a data communication connection to a compatible LAN. Wireless links may also be implemented.

In any such implementation, the communication interface 1518 sends and receives electrical electromagnetic or optical signals that carry digital data streams representing various types of information.

The network link 1520 typically provides data communication through one or more networks to other data devices. For example, the network link 1520 may provide a connection through the local network 1522 to a host computer 1524 or to data equipment operated by an Internet Service Provider (ISP). The ISP in turn provides data communication services through the Internet 1528. The local network 1522 and the Internet 1528 both use electrical, electromagnetic or optical signals that carry digital data streams. The signals through the various networks and the signals on the network link 1520 and through the communication interface 1518, which carry the digital data to and from the server 1530, are exemplary forms or carrier waves transporting the information.

The server 1530 can send/receive messages and data, including e-mail, program code, through the network, the network link 1520 and the communication interface 1518. Further, the communication interface 1518 can comprise a USB/Tuner and the network link 1520 may be an antenna or cable for connecting the server 1530 to a cable provider, satellite provider or other terrestrial transmission system for receiving messages, data and program code from another source.

The example versions of the embodiments described herein may be implemented as logical operations in a distributed processing system such as the system 1500 including the servers 1530. The logical operations of the embodiments may be implemented as a sequence of steps executing in the server 1530, and as interconnected machine modules within the system 1500. The implementation is a matter of choice and can depend on performance of the system 1500 implementing the embodiments. As such, the logical operations constituting said example versions of the embodiments are referred to for e.g., as operations, steps or modules.

Similar to a server 1530 described above, a client device 1501 can include a processor, memory, storage device, display, input device and communication interface (e.g., e-mail interface) for connecting the client device to the Internet 1528, the ISP, or LAN 1522, for communication with the servers 1530. The system 1500 can further include computers (e.g., personal computers, computing nodes) 1505 operating in the same manner as client devices 1501, where a user can utilize one or more computers 1505 to manage data in the server 1530.

Figure 16:
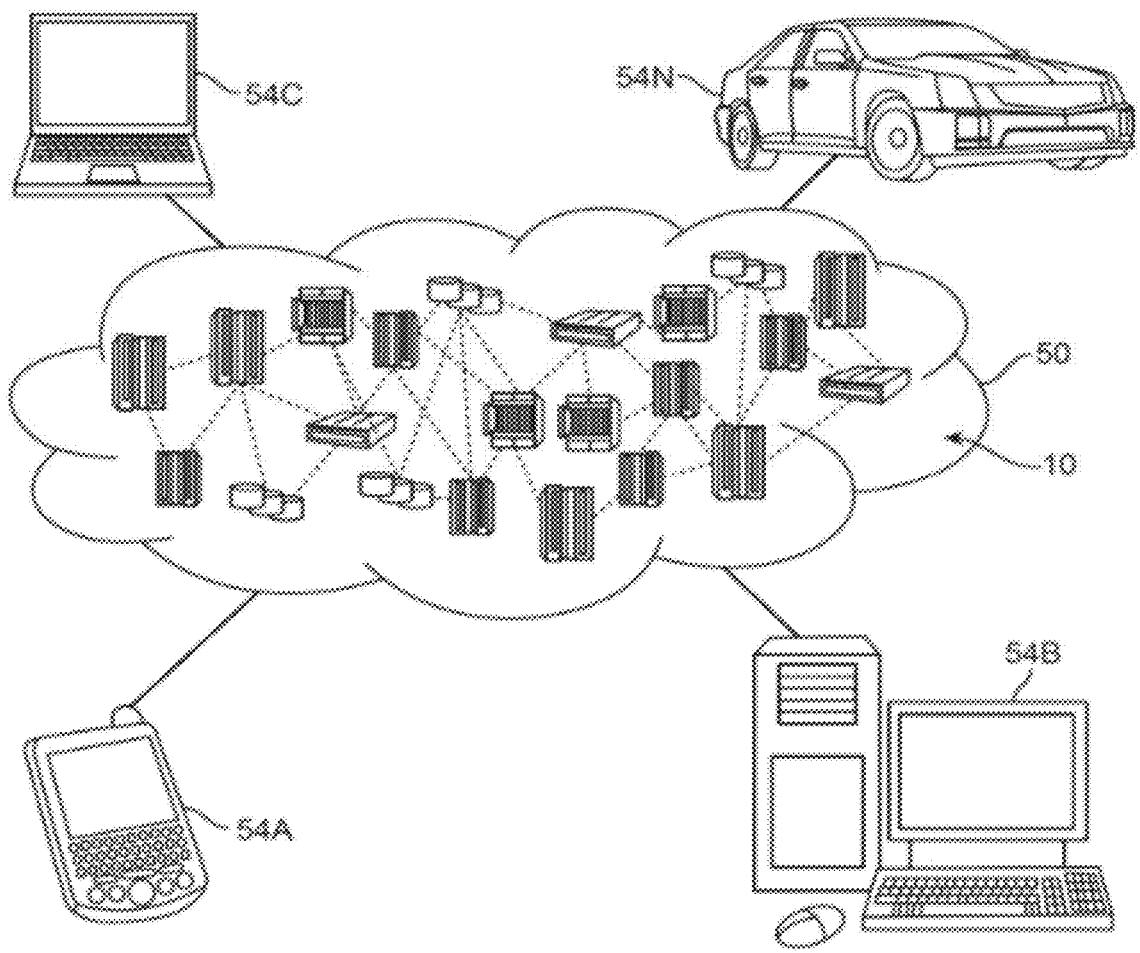
FIG. 16 depicts a cloud computing environment for implementing an embodiment of the system and process disclosed herein.

Referring now to FIG. 16, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 16 are intended to be illustrative only and that computing nodes 10 and cloud computing environment 50 can communicate with any type of computerized device over any type of network and/or network addressable connection (e.g., using a web browser).

Figure 17:
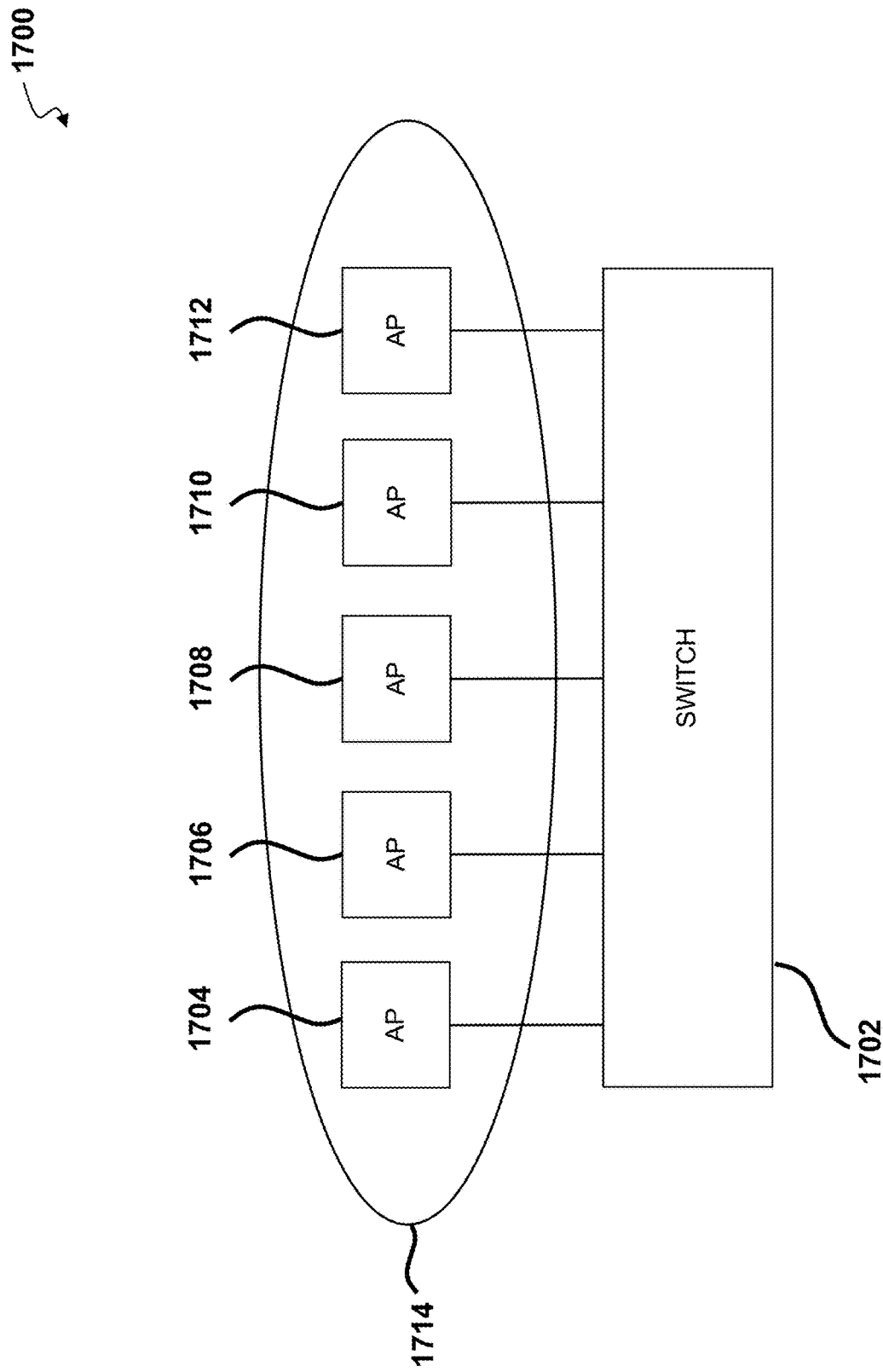
FIG. 17 depicts a single channel network in accordance with an embodiment of the invention.

FIG. 17 depicts a single channel network 1700 in accordance with an embodiment of the invention. In the single channel network 1700, a plurality of access points (APs) 1704, 1706, 1708, 1710, 1712 use a same channel and a same media access control (MAC) address. A wired LAN interface of each device in the single channel network 1700 is used to send messages between all of the APs 1704, 1706, 1708, 1710, 1712, usually via a switch 1702. The disclosed system and method send synchronization frames over a wired LAN to synchronize the single channel system 1714.

Figure 18:
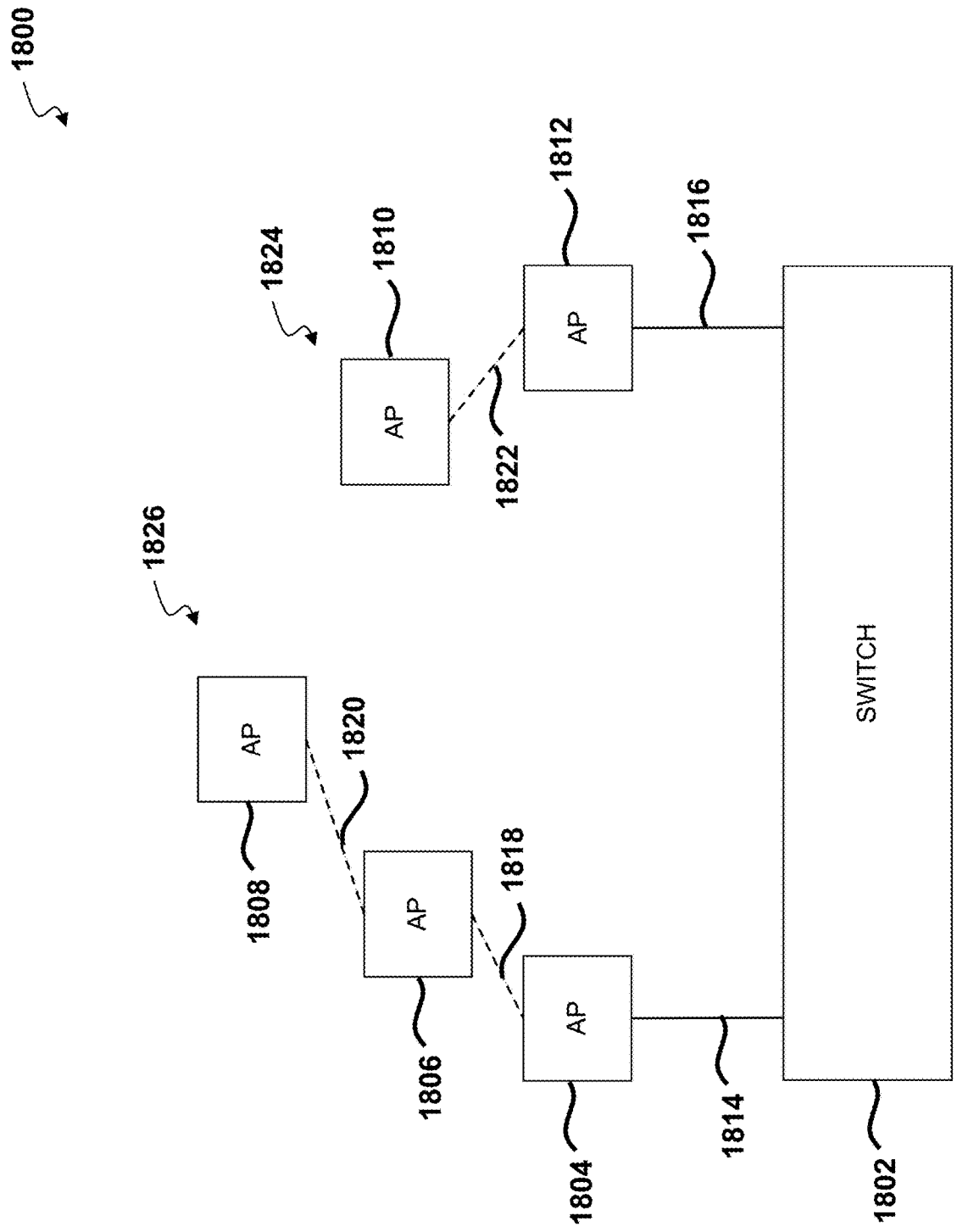
FIG. 18 depicts a wireless network topology in accordance with an embodiment of the invention.

FIG. 18 depicts a wireless network topology 1800 in accordance with an embodiment of the invention. In the wireless network topology 1800, one or more access points (APs) 1804, 1806, 1808, 1810, 1812 are connected by wire 1814, 1816 to the core network. The wired APs are portal APs 1804, 1812. The portal APs 1804, 1812 may be connected to a switch 1802 via a wired interface 1814, 1816, such as Ethernet. In the wireless network topology 1800, one or more APs are not wired. These non-wired APs are satellite APs 1806, 1808, 1810, 1812. The satellite APs 1806, 1808, 1810 may find a wireless path 1818, 1820, 1822 to the portal APs 1804, 1812.

By way of example, a first satellite AP 1808 may be wirelessly connected 1820 to second satellite AP 1806. The second satellite AP 1806 may be wirelessly connected 1818 to a first portal AP 1804. The first portal AP 1804 may have a wired connection 1814 to the switch 1802. A third satellite AP 1810 may be wirelessly connected 1822 to a second portal AP 1812. The second portal AP 1812 may have a wired connection 1816 to the switch 1802. The wired connections 1814, 1816 are depicted in solid lines and the wireless connections 1818, 1820, 1822 are depicted in dashed lines. In such configuration, any data sent from a wired network to a satellite AP may be proxied through portal APs and other satellite APs. In the same way, any data sent from the satellite AP to the wired network may be proxied via portal APs and other satellite APs. In cases where a satellite AP needs to communicate with another satellite AP which is not in wireless range, the messages may be proxied through portal APs in the sending AP area to a portal AP in the receiving AP area.

For example, data may be sent from satellite AP 1810 in a sending AP area 1824 to satellite AP 1808 in a receiving AP area 1826. Satellite AP 1810 may not be in range to send data directly to satellite AP 1808, e.g., the sending AP area 1824 does not reach the satellite AP 1808 and the receiving AP area 1826 does not reach the satellite AP 1810. Data sent from satellite AP 1810 to satellite AP 1808 may be sent from satellite AP 1810 to portal AP 1812 via wireless connection 1822; from portal AP 1812 to switch 1802 via wired connected 1816; from switch 1802 to portal AP 1804 via wired connection 1814; from portal AP 1804 to satellite AP 1806 via wireless connection 1818; and from satellite AP 1806 to satellite AP 1808 via wireless connection 1820. The reverse path may be used to send data from satellite AP 1808 to satellite AP 1810. While one configuration of portal APs and satellite APs is shown, any combination of portal APs and satellite APs may be used in any wireless network topology in accordance with the system and method disclosed herein.

Figure 19:
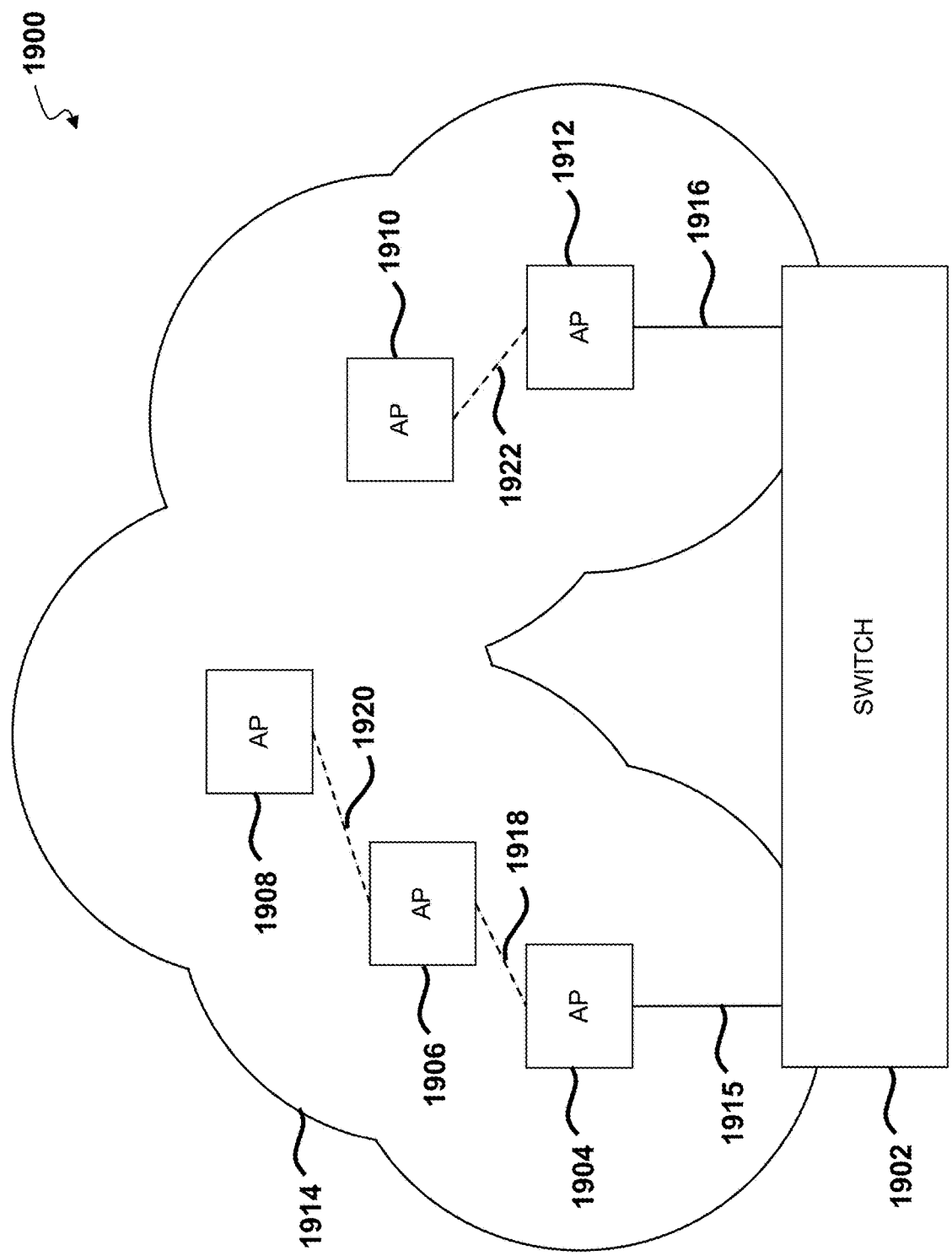
FIG. 19 depicts a single channel synchronization system for controlling wireless and wired access points in accordance with an embodiment of the invention.

FIG. 19 depicts a single channel synchronization system 1900 for controlling wireless access points 1906, 1908, 1910 and wired access points 1904, 1912 in accordance with an embodiment of the invention. The single channel synchronization system 1900 uses synchronization frames that run over a wired LAN. In wireless network topologies, some APs will not have a wired connection. The disclosed system and method adjusts synchronization frames to be sent over a wireless LAN to the APs 1906, 1908, 1910 not having a wired connection. Any synchronization frame may be duplicated and proxied multiple times via wired or wireless links throughout the single channel setup 1914 in order to get to its destination. Therefore, the system and method disclosed herein adjusts the synchronization frames to travel also over wireless medium and to contain additional information for multiple hop paths. The adjusted frame must hold additional source and destination addresses to identify the true originator and destination of the frame. To avoid loops and duplications caused by frame retransmission, the adjusted synchronization frames disclosed herein also hold a unique identifier so that devices will not repeat on sending it and ignore duplications. The adjusted frames disclosed herein refer to the duplicated and proxied synchronization frame. Each AP in the system maintains the history of frame identifiers that were received by the AP and if an identifier was received more than once then the AP will drop the frame with this identifier. All this additional information may be added in a new header on top of the existing synchronization header and on top of the layer 2 header. If a frame is sent over wireless LAN then it may be formatted such as, but not limited to, a vendor specific action. This way, the single channel control method is adjusted to run over an 802.11 wireless link 1918, 1920, 1922 as well as a wired, Ethernet link 1915, 1916 in the disclosed system and method. Single channel 1914 is allowed to run over APs without a wired link as well as APs with wired link because synchronization frames can be sent from any AP to any other AP in the same single channel 1914.

By way of example, a first satellite AP 1908 may be wirelessly connected 1920 to second satellite AP 1906. The second satellite AP 1906 may be wirelessly connected 1918 to a first portal AP 1904. The first portal AP 1904 may have a wired connection 1915 to a switch 1902. A third satellite AP 1910 may be wirelessly connected 1922 to a second portal AP 1912. The second portal AP 1912 may have a wired connection 1916 to the switch 1902. The wired connections 1915, 1916 are depicted in solid lines and the wireless connections 1918, 1920, 1922 are depicted in dashed lines. While one configuration of portal APs 1904, 1912 and satellite APs 1906, 1908, 1910 is shown, any combination of portal APs and satellite APs may be used in any wireless network topology in accordance with the system and method disclosed herein. The synchronization frames may be sent by any device in the system 1900 to the first portal AP 1904 and second portal AP 1912 via a wired link. The synchronization frames may also be sent by any device in the system to the first satellite AP 1908, the second satellite AP 1906, and the third satellite AP 1910. In such case, the synchronization frames may be sent on wireless links 1918, 1920, 1922, proxied from wired links 1915, 1916, or any combination of the two. For example, a synchronization frame from 1910 to 1908 may be sent directly if devices are within wireless range or proxied in the following order: 1910, 1912, 1902, 1904, 1906, 1908.

Accordingly, all of the APs receive the synchronization frames and not just the wired connected APs. The disclosed system and method adapts the LAN messaging from a wired network only to messaging that may be sent over both a wired network and a wireless network. The disclosed system and method removes the need to connect cables between APs in a single channel system and ultimately allows single channel deployment over any wireless network topology.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A system comprising:
   a switch;
   one or more portal access points (APs), wherein each portal AP of the one or more portal APs is connected to the switch by a wired connection; and
   one or more satellite APs, wherein each satellite AP of the one or more satellite APs is configured to utilize one or more wireless paths to a portal AP of the one or more portal APs by a wireless connection;
   wherein each portal AP and each satellite AP is configured to utilize a channel blanket (CB) as part of a single channel architecture, such that each portal AP employs a same channel and a same basic service set (BSS) media access control (MAC) address, and each satellite AP employs a same channel and a same basic service set (BSS) media access control (MAC) address;
   wherein when one or more synchronization frames are transmitted between the one or more portal APs and the one more satellite APs, the one or more portal APs are configured to receive the one or more synchronization frames via at least one of: a wired LAN and a wireless LAN, and the one or more satellite APs are configured to receive the one or more synchronization frames via the wireless LAN;
   wherein each synchronization frame of the one or more synchronization frames includes information on an origin source address and a destination address to uniquely identify an originator and a destination for each synchronization frame;
   wherein each synchronization frame includes a unique identifier whereby each portal AP and each satellite AP is configured to maintain a history of unique identifiers of the received synchronization frames to detect receiving the same synchronization frame more than once such that if a particular unique identifier is received more than once then the receiving AP is configured to drop the corresponding synchronization frame with said unique identifier;
   wherein the one or more synchronization frames are proxied between at least two of: the one or more portal APs and the one or more satellite APs; and
   wherein the proxied synchronization frames are forwarded to: the one or more portal APs and the one or more satellite APs while avoiding resending and receiving a frame of the proxied synchronization frames more than once.

2. The system of claim 1, wherein at least one satellite AP is configured such that data sent from the switch to the at least one satellite AP is proxied through at least one portal AP within the channel blanket.

3. The system of claim 2, wherein data sent from the switch to the satellite AP and through the portal AP, is further proxied through one or more satellite APs creating two or more wireless hops within the channel blanket.

4. The system of claim 1, wherein at least one satellite AP is configured such that data sent from the satellite AP to the switch is proxied through the portal AP within the channel blanket.

5. The system of claim 2, wherein data sent from the satellite AP to the switch is further proxied through one or more satellite APs before the portal AP creating two or more wireless hops within the channel blanket.

6. The system of claim 1, wherein data sent from a first satellite AP of the one or more satellite APs to a second satellite AP of the one or more satellite APs is proxied through a first portal AP of the one or more portal APs in a sending AP area to a second portal AP of the one or more portal APs in a receiving AP area.

7. The system of claim 1, wherein each proxied synchronization frame is duplicated and proxied multiple times throughout the single channel architecture via at least one of: wired links and wireless links.

8. The system of claim 7, wherein each duplicated and proxied synchronization frame comprises a source address and a destination address.

9. The system of claim 8, wherein each duplicated and proxied synchronization frame further comprises an original source address and an original destination address.

10. The system of claim 9, wherein the original source address holds the source of an original frame of the proxied synchronization frames.

11. The system of claim 10, wherein the original destination address holds a destination of the original frame of the proxied synchronization frames.

12. The system of claim 8, wherein the source address identifies an originator of the proxied synchronization frame, wherein the originator is one of the one or more portal APs.

13. The system of claim 8, wherein the source address identifies an originator of the proxied synchronization frame, wherein the originator is one of the one or more satellite APs.

14. The system of claim 8, wherein the destination address identifies a destination of the proxied synchronization frame, wherein the destination address is one of the one or more portal APs.

15. The system of claim 8, wherein the destination address identifies a destination of the proxied synchronization frame, wherein the destination address is one of the one or more satellite APs.

16. The system of claim 8, wherein each duplicated and proxied synchronization frame comprises a unique identifier, wherein the one or more portal APs and the one or more satellite APs ignore duplicates of the unique identifier from a received proxied synchronization frame and prevent loops.

17. The system of claim 8, wherein each proxied synchronization frame sent over the wireless LAN is encapsulated under a frame subtype.

18. The system of claim 17, wherein the frame subtype is a vendor specific action frame.

\* \* \* \* \*